US012449119B2

(12) United States Patent
Levine et al.

(10) Patent No.: US 12,449,119 B2
(45) Date of Patent: Oct. 21, 2025

(54) METHOD, SYSTEM, AND APPARATUS FOR ILLUMINATING DESIGNER SMART ACCESSORIES

(71) Applicant: Asher Levine Inc., Los Angeles, CA (US)

(72) Inventors: Asher Levine, Los Angeles, CA (US); Tyson Tabbert, Los Angeles, CA (US); Christian Smith, Encinitas, CA (US); John Stump, Santa Barbara, CA (US)

(73) Assignee: Asher Levine Inc., Los Angeles, CA (US)

( * ) Notice: Subject to any disclaimer, the term of this patent is extended or adjusted under 35 U.S.C. 154(b) by 0 days.

(21) Appl. No.: 18/655,139

(22) Filed: May 3, 2024

(65) Prior Publication Data
US 2024/0369217 A1 Nov. 7, 2024

Related U.S. Application Data

(63) Continuation of application No. PCT/US2022/079346, filed on Nov. 4, 2022.
(Continued)

(51) Int. Cl.
*F21V 33/00* (2006.01)
*F21L 4/08* (2006.01)
(Continued)

(52) U.S. Cl.
CPC ............ *F21V 33/0008* (2013.01); *F21L 4/08* (2013.01); *F21V 5/006* (2013.01); *F21V 7/0008* (2013.01);
(Continued)

(58) Field of Classification Search
CPC ........ F21V 33/0008; F21V 7/24; F21V 5/006; F21V 7/008; F21V 13/045; F21V 15/012; F21V 23/003; F21V 23/0414; F21L 4/08
See application file for complete search history.

(56) References Cited

U.S. PATENT DOCUMENTS 7,111,959 B2 * 9/2006 Kurcz .................... A45C 15/06
362/156
7,246,915 B2 * 7/2007 Verona .................... A45C 15/06
362/156
(Continued)

FOREIGN PATENT DOCUMENTS

DE 202013105682 U1 1/2014

OTHER PUBLICATIONS

The International Bureau of WIPO, "International Preliminary Report on Patentability" in Application No. PCT/US2022/079346, May 2, 2024, 9 pages.
(Continued)

*Primary Examiner* — Bryon T Gyllstrom
(74) *Attorney, Agent, or Firm* — Davis Wright Tremaine LLP

(57) ABSTRACT

Apparatus, system, and method embodiments are disclosed for illuminating clothing, fashion accessories, and other items using diffusion and reflection of light from a light source. A fashion accessory can include a diffusion layer to provide a unique visual appearance from the light source based on the diffusion layer's manipulation of photon wavelength. The diffusion layer can reside under an exterior shell of the fashion accessory and diffuse light from the light source, providing a unique design aspect to the fashion accessory. The fashion accessory can further include a light refraction chamber to direct light in a visually appealing way, providing variations in quality and texture of the light that an observer sees. Additional layers of material over the exterior shell can provide additional variations in quality and texture of the observed light.

17 Claims, 17 Drawing Sheets

Related U.S. Application Data

(60) Provisional application No. 63/275,943, filed on Nov. 4, 2021.

(51) Int. Cl.

| | | |
|---|---|---|
| *F21V 5/00* | (2018.01) | |
| *F21V 7/00* | (2006.01) | |
| *F21V 7/24* | (2018.01) | |
| *F21V 13/04* | (2006.01) | |
| *F21V 15/01* | (2006.01) | |
| *F21V 23/00* | (2015.01) | |
| *F21V 23/04* | (2006.01) | |
| *F21W 121/06* | (2006.01) | |
| *F21Y 105/12* | (2016.01) | |
| *F21Y 109/00* | (2016.01) | |
| *F21Y 115/10* | (2016.01) | |

(52) U.S. Cl.
CPC ............... *F21V 7/24* (2018.02); *F21V 13/045* (2013.01); *F21V 15/012* (2013.01); *F21V 23/003* (2013.01); *F21V 23/0414* (2013.01); *F21W 2121/06* (2013.01); *F21Y 2105/12* (2016.08); *F21Y 2109/00* (2016.08); *F21Y 2115/10* (2016.08)

(56) References Cited

U.S. PATENT DOCUMENTS

| | | | |
|---|---|---|---|
| 9,687,055 B2* | 6/2017 | Wong | A45C 13/02 |
| 2004/0017679 A1* | 1/2004 | Parsons | F21V 23/0414 |
| | | | 362/208 |
| 2004/0090773 A1* | 5/2004 | Bryan | A45C 13/28 |
| | | | 362/183 |
| 2005/0000777 A1 | 1/2005 | Ringdahl et al. | |
| 2005/0174756 A1 | 8/2005 | Verburg | |
| 2006/0227538 A1* | 10/2006 | Williams | A45C 15/06 |
| | | | 362/156 |
| 2010/0053941 A1* | 3/2010 | Ibison | A45C 15/06 |
| | | | 362/156 |
| 2013/0190845 A1 | 7/2013 | Liu et al. | |
| 2015/0320181 A1 | 11/2015 | Moncada et al. | |
| 2017/0049204 A1* | 2/2017 | Valkenhoff | F21V 21/0885 |
| 2018/0116627 A1 | 5/2018 | Mulumudi et al. | |
| 2019/0343257 A1* | 11/2019 | Ragans | F21V 23/04 |
| 2020/0229570 A1* | 7/2020 | Mitchell | A45C 3/06 |
| 2021/0169193 A1* | 6/2021 | Neumann | F21V 23/045 |

OTHER PUBLICATIONS

The International Searching Authority, "Written Opinion and Search Report" in Application No. PCT/US22/79346, Mar. 7, 2023, 14 pages.

European Patent Office, "Search Report" in Application No. 22891121.0-1015, Jul. 23, 2025, 9 pages.

\* cited by examiner

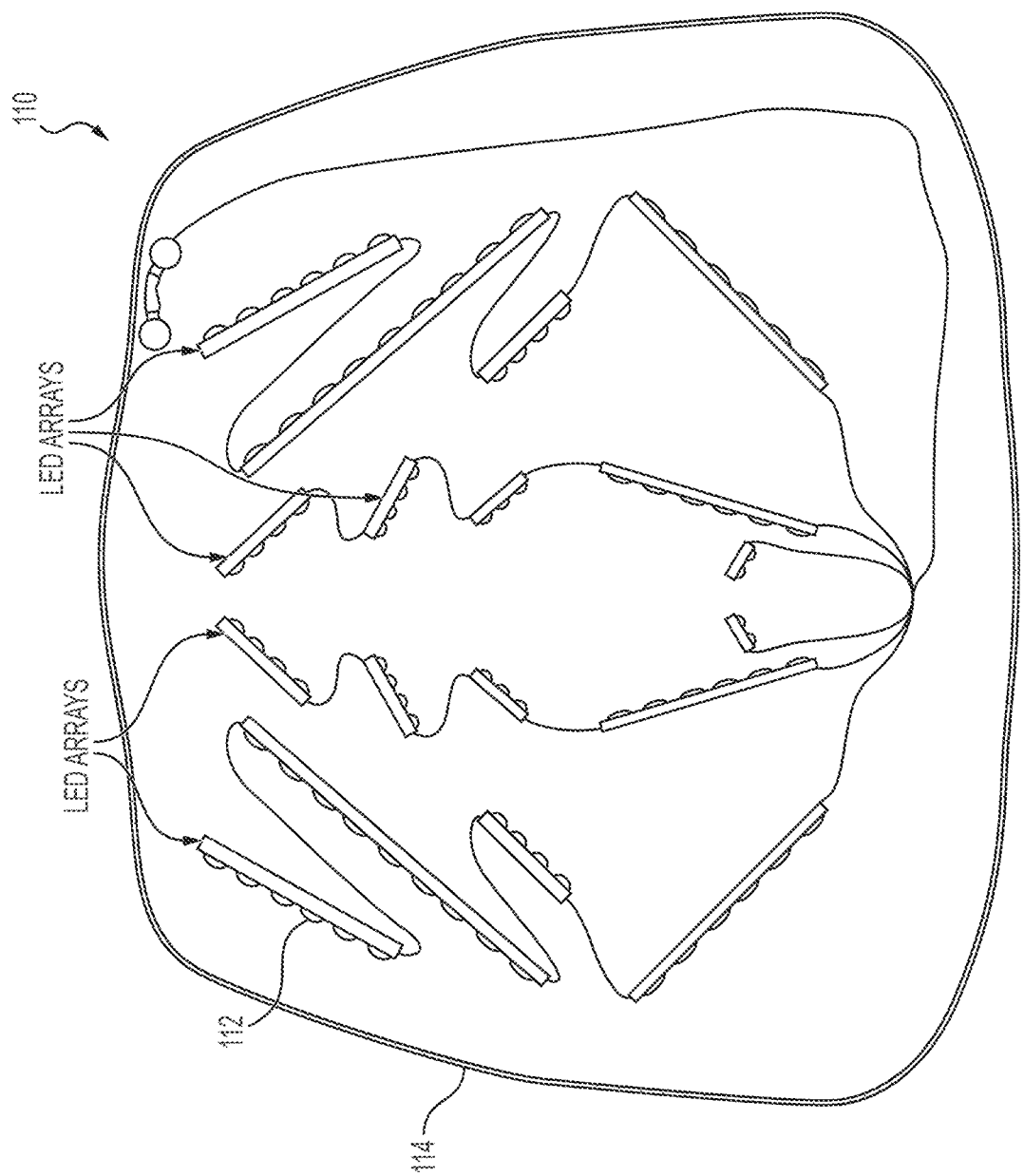

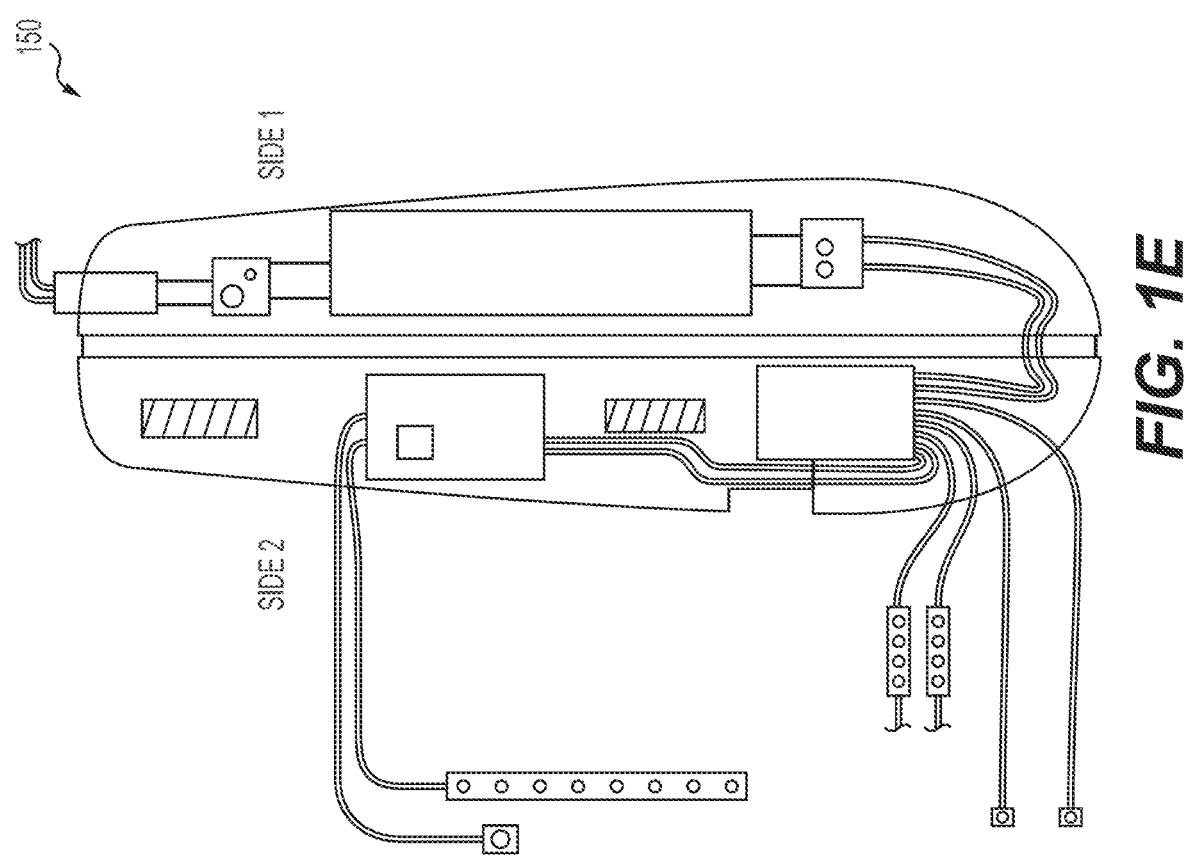

METHOD, SYSTEM, AND APPARATUS FOR ILLUMINATING DESIGNER SMART ACCESSORIES

CROSS-REFERENCE TO RELATED APPLICATIONS

This application is a continuation of International Application No. PCT/US2022/079346, filed Nov. 4, 2022, entitled "METHOD, SYSTEM, AND APPARATUS FOR ILLUMINATING DESIGNER SMART ACCESSORIES," which claims the benefit of U.S. Provisional Application No. 63/275,943, filed Nov. 4, 2021, entitled "METHOD, SYSTEM, AND APPARATUS FOR ILLUMINATING DESIGNER SMART ACCESSORIES," which is hereby incorporated herein by reference in its entirety and for all purposes.

FIELD OF THE INVENTION

Embodiments relate generally to designer clothing and fashion accessories. More particularly, embodiments relate to methods, systems, and apparatuses for illuminating clothing, fashion accessories, and other items using diffusion and reflection of light from a light source, such as light emitting diodes (LEDs).

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present disclosure, or any embodiments thereof, to anything stated or implied therein or inferred thereupon.

Currently, clothing and fashion accessories that have LEDs are positioned to emit light directly out of the garment or directly through a single piece of clear plastic, the concentration of the light emitted from a small source directly to the viewer's eye. Such light may be harsh, of an undesirable brightness, or may not be well-suited for clothing or fashion accessories.

Accordingly, there is a need for improved methods, systems, and apparatus for lighting designer clothing and fashion accessories.

BRIEF DESCRIPTION OF THE DRAWINGS

Various techniques will be described with reference to the drawings. Some embodiments illustrated in the drawings are provided as examples and are not limited by the figures shown, in which like references may indicate similar elements, and in which:

FIG. 1B illustrates an example diagram of an LED map within a shell of a designer smart accessory purse, in accordance with an embodiment;

FIG. 1E illustrates an example diagram of the system control hardware, as viewed within the lower footprint of the designer smart accessory purse, in accordance with an embodiment;

Figure 1A:
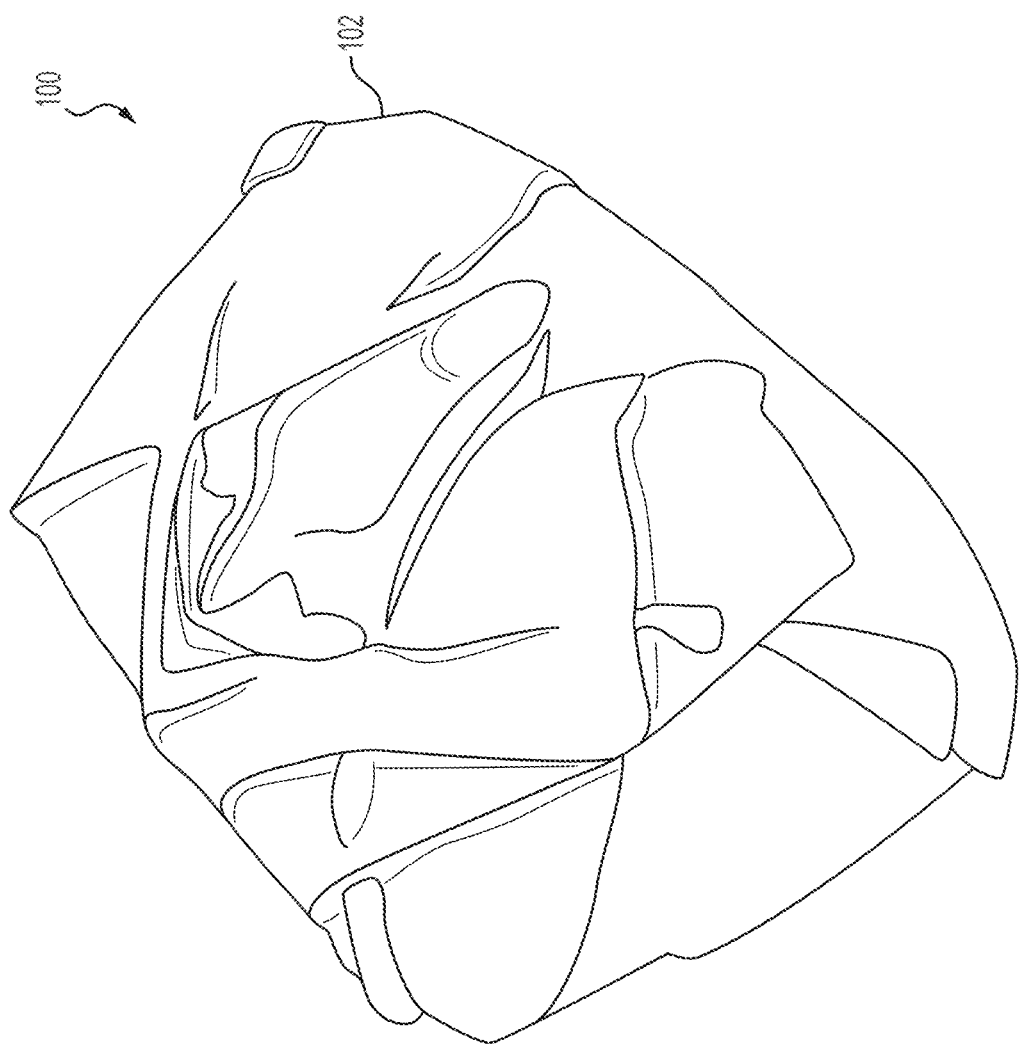
FIG. 1A illustrates an example of an exterior shell of a designer smart accessory purse, in accordance with an embodiment.

Unless otherwise indicated, illustrations in the figures are not necessarily drawn to scale. The various illustrated embodiments can be better understood by turning to the following detailed description of the illustrated embodiments. It is to be expressly understood that the illustrated embodiments are set forth as examples and not limitations of the disclosure as ultimately defined in the claims.

DETAILED DESCRIPTION

Techniques and systems described below relate to illuminating clothing, fashion accessories, and other items using diffusion and reflection of light from a light source, such as from a system of light emitting diodes (LEDs). In one example, a fashion accessory (e.g., a clutch, handbag, purse, or other fashion or designer accessory) can include a diffusion layer that can provide a unique visual appearance from the light source based on the diffusion layer's manipulation of photon wavelength. The diffusion layer can include the LEDs and related electronics, and the light can pass through the diffusion layer around the LEDs. The diffusion layer can reside under an exterior shell of the accessory and diffuse light from the LEDs or other emitting hardware elements to provide a unique design aspect to the fashion accessory.

The fashion accessory can further include a light refraction chamber, wherein the LEDs do not point straight out and can be positioned greater than a 90-degree angle, pointing away from the outer-facing surface vector. In some embodiments, the LEDs can reflect off a reflective surface before the light passes through the exterior shell.

Variations in reflection affected by various applied coatings to the exterior shell can provide variations in quality and texture of the light that an observer sees. Additional layers of material, such as fabric, over the exterior shell, can provide additional variations in quality and texture of the light that an observer sees. The various combinations provide innovations in fashion design using light and illumination.

In some embodiments, the fashion accessory can project patterns of light, optionally incorporating variations as described above, onto other surfaces to display patterns, logos, or other images.

Embodiments can further include a software application, where the LEDs can be customizable via use of the software application.

In some embodiments, the fashion accessory can function as a container comprising a variety of specific material elements, hardware, and software technologies to achieve a visually appealing design and user experience.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of clothing and fashion accessory design, especially as it applies to wearable, smart technologies. Specifically, the techniques described and suggested in the present disclosure improve methods of illuminating clothing, fashion accessories, and other items using diffusion and reflection of emitted light, which can make the emitted light more appealing to the eye. Additionally, techniques described and suggested in the present disclosure improve the functioning of wearable technologies in the fashion accessory design space by unifying a variety of specific material elements, hardware, and software technologies to achieve a visually appealing design and improved user experience.

Each of the disclosed techniques has individual benefit and each can also be used in conjunction with one or more, or in some cases all, of the other disclosed techniques. Accordingly, for the sake of clarity, this description will refrain from repeating every possible combination of the individual steps or elements. Nevertheless, the specification and claims should be read with the understanding that such combinations are entirely within the scope of the disclosure and the claims. Further, although numerous specific details are set forth in order to provide a thorough understanding of the present disclosure, it will be evident to one skilled in the art that the present embodiments may be practiced without these specific details. It is to be further understood that the following disclosure is not intended to be limited to the specific embodiments disclosed.

As is well known to those skilled in the art, many careful considerations and compromises typically must be made when designing for the optimal configuration of a commercial implementation of any system and, in particular, the embodiments of the present disclosure. A commercial implementation in accordance with the spirit and teachings of the present disclosure may be configured according to the needs of the particular application, whereby any aspect(s), feature (s), function(s), result(s), component(s), approach(es), or step(s) of the teachings related to any of the following described embodiments of the present disclosure may be suitably omitted, included, adapted, mixed and matched, or improved and/or optimized by those skilled in the art, using their average skills and known techniques, to achieve the desired implementation that addresses the needs of the particular application.

FIG. 1A illustrates an example embodiment 100 of an exterior shell 102 of a designer smart accessory purse. The exterior shell 102 can have one or more layers. The one or more layers of the exterior shell 102 can house or include an outer design layer, outer layer elements, an internal diffusion layer, base layers, and purse internal shell layers.

The exterior shell 102 can be made of elements including, but not limited to, plastics including thermoplastic and thermoset plastic, polyurethanes, foams, lenticular plastics, metals, plated metal on plastics/organics in chrome, rhodium, gold, or other precious or non-precious metals, organic materials such as cotton, wools, and/or leathers, molded leathers, and organic lab grown leather such as fruit leathers, mycelium, in sheets or fibers, or special cast textures. A person having ordinary skill in the relevant art could contemplate additional materials to be used in the manufacture of the exterior shell 102.

The exterior shell layers can be cut, sewn, and/or formed using a vacuum forming (i.e., vacu-form) or plastic injection process. Vacuum forming is a version of thermoforming, in which a sheet of plastic is heated to a forming temperature, stretched onto a single-surface mold, and forced against the mold by a vacuum. For example, this process can be used to form plastic into an exterior shell.

Materials used to make the exterior shell 102 can vary in translucency to achieve a desired visual, e.g., light-emitting, effect. Additionally, as illustrated in FIG. 1A, the exterior shell 102 of the designer smart accessory purse can incorporate cuts, gaps, and/or openings in the exterior shell material to allow light through the cuts, gaps, and/or openings for a visually appealing pattern when the designer smart accessory purse is illuminated.

FIG. 1B illustrates an example diagram 110 of an LED map 112 within a shell 114 of a designer smart accessory purse, in accordance with an embodiment. As illustrated in FIG. 1B, the LED map 112 can include a plurality of electrically connected arrays (i.e., strings) of LEDs. The plurality of electrically connected arrays of LEDs can be routed from one or more controllers and/or switches (shown later in FIGS. 1C-1E) located in the designer smart accessory purse. Each of the electrically connected arrays of LEDs can be routed through, on, or within, and/or be affixed or bonded to (e.g., by an epoxy or sewn), the shell 114, which can include the one or more layers of the exterior shell 102 and an interior shell (shown in FIG. 2) of the designer smart accessory purse.

A portion of the plurality of electrically connected arrays of LEDs can route through, on, or within, and/or be affixed or bonded to, the exterior shell 114, and another portion of the plurality of electrically connected arrays of LEDs can route through, on, or within, and/or be affixed or bonded to, the interior shell of the designer smart accessory purse. Preferably, the portion of the plurality of electrically connected arrays of LEDs routing through, on, or within the exterior shell 114 of the designer smart accessory purse can be electrically connected to a first controller or switch, and the portion of the plurality of electrically connected arrays of LEDs routing through, on, or within the interior shell of the designer smart accessory purse can be electrically connected to a second controller or switch. The separate control mechanisms of the first and second controllers/switches allow for the exterior and interior portions of the designer smart accessory purse to be illuminated independently from one another, as further described below.

Figure 1C:
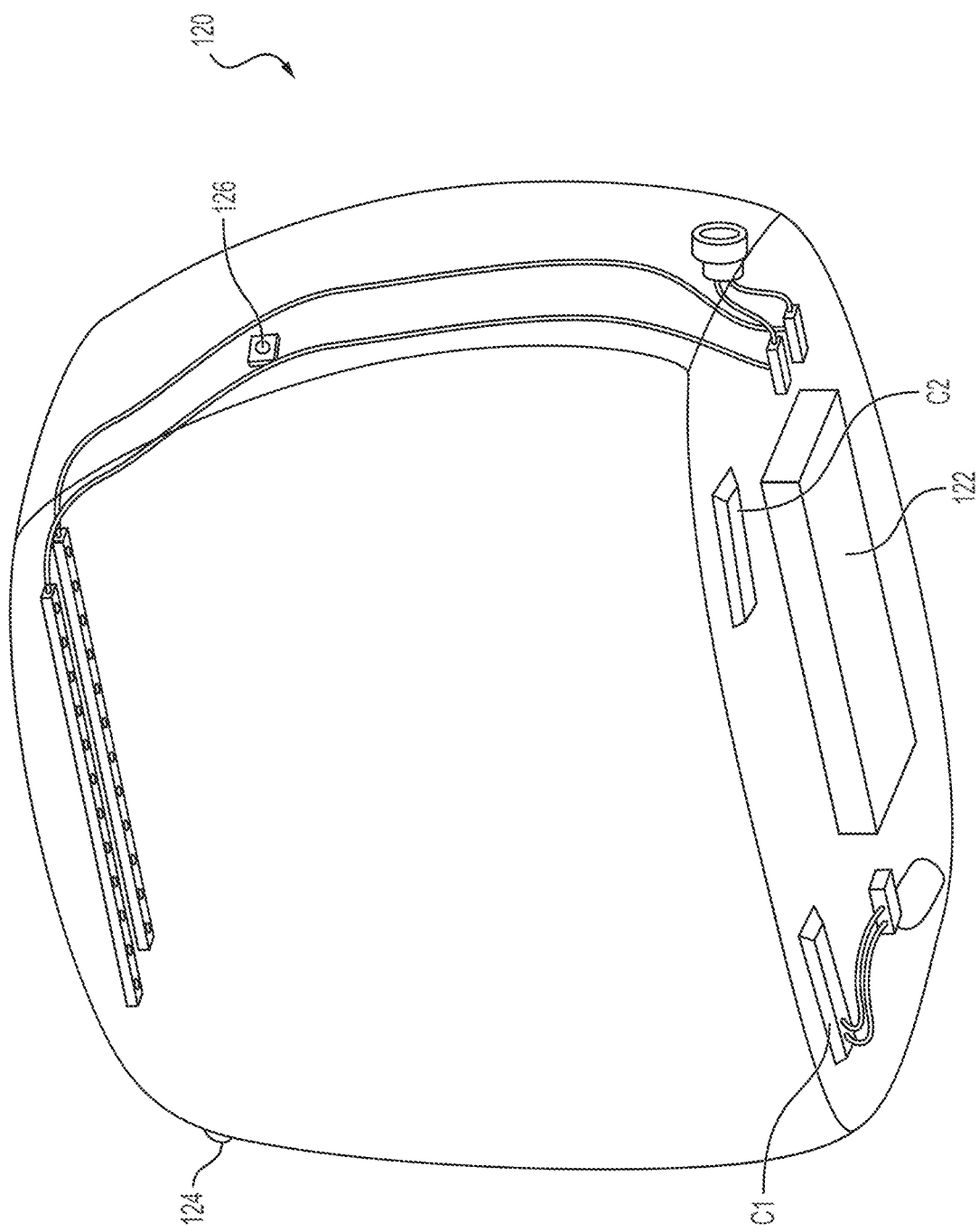
FIG. 1C illustrates an example diagram of the system control hardware installed within the designer smart accessory purse, in accordance with an embodiment.

FIG. 1C illustrates an example diagram 120 of the system control hardware installed within the designer smart accessory purse, in accordance with an embodiment. As illustrated in FIG. 1C, the first controller C1 and the second controller C2 can preferably be located together in the bottom portion of the designer smart accessory purse along with other components of the system control hardware, such as a battery 122. Battery 122 can include one or more battery modules. Such compact and modular arrangement of the system control hardware at the bottom of the designer smart accessory purse provides a stable base for the hardware components and minimizes physical interference with a user's access to the internal space of the purse.

With such arrangement of the system control hardware within the designer smart accessory purse, wiring can be routed along the internal sides of the purse, between the shell layers, to user-accessible control mechanisms (e.g., on/off buttons) near the top entry of the purse, as illustrated by the exemplary placement of an exterior button 124 and an interior button 126. The exterior button 124 and interior button 126 can be separately controlled for illuminating the plurality of electrically connected arrays of LEDs independently between the exterior LED arrays and the interior LED arrays, respectively.

Figure 1D:
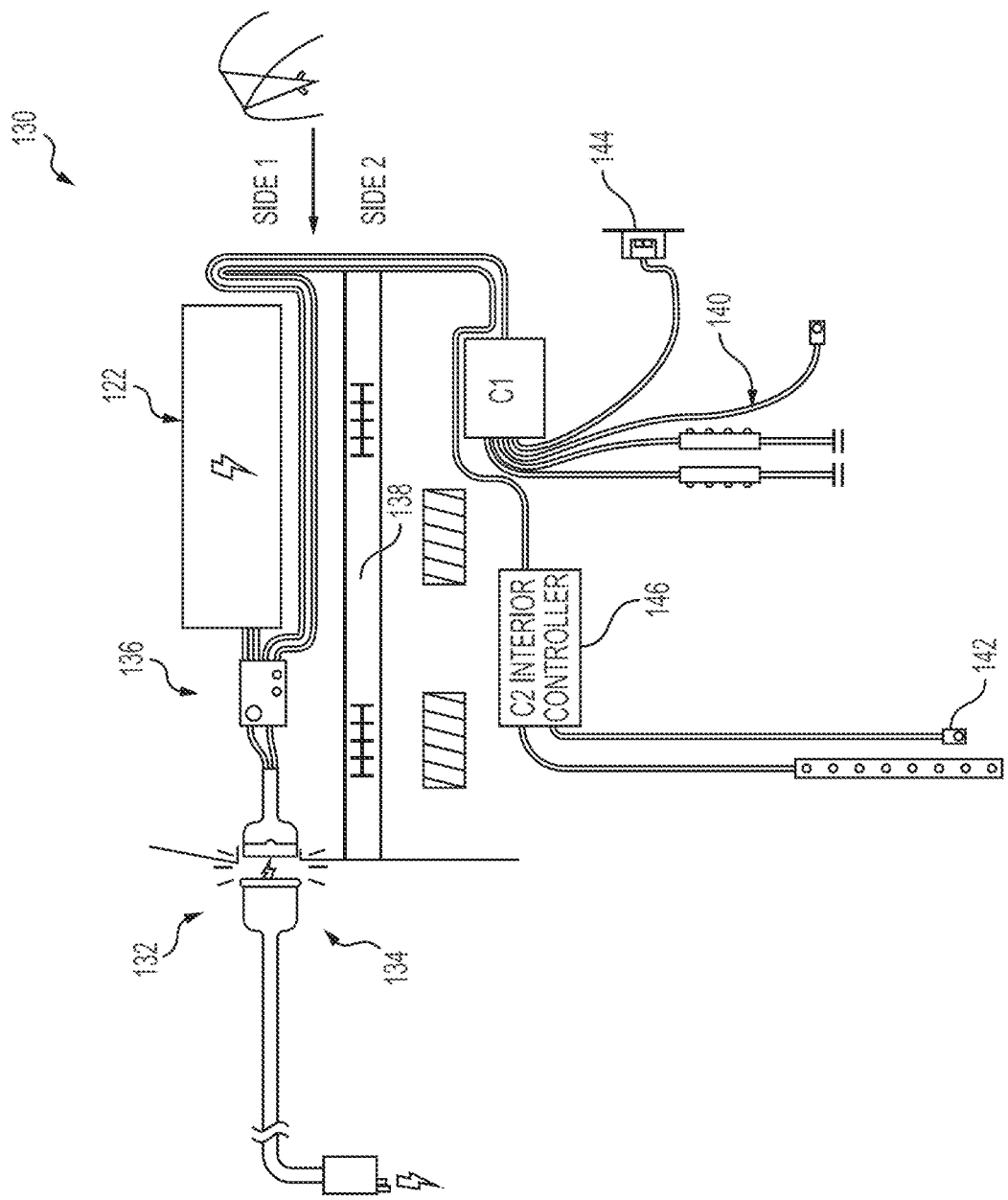
FIG. 1D illustrates an example schematic diagram of system control hardware for control of interior and exterior illumination and lights of a designer smart accessory purse, in accordance with an embodiment.

FIG. 1D illustrates an example schematic diagram 130 of system control hardware for control of interior and exterior illumination and lights of a designer smart accessory purse, in accordance with an embodiment. Components of the system control hardware can be separated on two sides of the designer smart accessory purse, as shown in FIG. 1D, for functional spacing and weight balance. Side 1 can include, for example, a charging port 132, charging circuit 136, and the battery 122. Side 2 can include, for example, exterior controller C1 and interior controller C2. The charging port 132 can couple to an external power supply to provide electrical power to one or more electrical components of the accessory.

The two sides can be separated by a weighted hinge mechanism 138 at the bottom centerline of the purse, allowing for the system control hardware components to move with and conform to the natural movement of the purse when the purse is carried by a user. The electrical wires connecting the two sides of the hardware components can be hidden as they pass through the metal frame of the purse from side 1 to side 2. Although the wires can pass through the main compartment of the purse, they are never seen by the user of the purse because they are maintained in the gusset of the purse. This allows for a clean design from the perspective of the user and minimizes physical interference with a user's access to the internal space of the purse.

As illustrated in FIG. 1D, on side 1, the system control hardware can include an optional charging port 132 for connecting an external power supply to recharge the battery 122 (if rechargeable) and/or power components of the accessory. Battery 122 may be any type of battery typically used in consumer electronics, disposable or rechargeable, such as alkaline, lithium, nickel-metal-hydride, nickel-cadmium, and zinc carbon batteries, for example. Optional charging port 132 can be recessed into the exterior shell of the designer smart accessory purse for a discreet, protected, and structurally supported interface of an external power supply to the purse. Additionally, the optional charging port 132 may have a magnetic mechanism 134 for a quick-connect attachment to the external power supply for ease and convenience of charging the battery 122. In at least one embodiment, the optional charging port 132 is integrated into a bottom external surface of the accessory. In at least one embodiment, the optional charging port 132 is integrated into one or more feet of the accessory, the one or more feet designed to support the accessory when placed on the ground. In at least one embodiment, the optional charging port 132 is designed to couple to an external charging station designed to electrically couple to the optional charging port 132. In at least one embodiment, the external charging station is designed to charge one or more batteries of the accessory when the accessory is set down on the charging station by a user of the accessory.

Further describing the side 1 hardware components of FIG. 1D, the system control hardware may include a charging circuit 136, which may be a power regulator microcontroller PCB, for converting 120 VAC power to 12 VDC power, and monitoring, controlling, and regulating the 12 VDC charging power to the battery 122. In at least one embodiment, the charging circuit 136 can convert any VAC power to any VDC power. For example, the charging circuit 136 can convert 110-240 VAC power to 12 VDC power.

Side 2 hardware components of FIG. 1D include the previously described exterior controller C1 and interior controller C2. Each of the controllers C1 and C2 can turn the LED arrays on or off with a user-controlled switch or button 140/142, a magnet, or a sensor, for example.

Buttons and switches can include, but are not limited to, actuating, touch/sound sensitive, motion, and magnetic, to control the system and functions onboard the designer smart accessory purse. The buttons and switches can be integrated into the exterior shell, the interior shell, or a handle of the purse.

Sensors of the designer smart accessory purse, for example, can include sensing apparatus for sound, such as a microphone, capacitive sensors, capacitive touch sensors, capacitive fingerprint sensors, temperature sensors, infrared sensors, camera, accelerometer, air particle sensors, and the like. The C1 sensor 144 is preferably a mesh metal protection sound sensor microphone. The C2 sensor 146 is preferably a proximity sensor.

Closure mechanisms of the designer smart accessory purse, for example, can include metal frames or port openings that allow access and close the system. The closure mechanism can be metal, polymeric, or natural, for example.

FIG. 1E illustrates an example diagram 150 of the system control hardware, as viewed within the lower footprint of the designer smart accessory purse, in accordance with an embodiment. FIG. 1E illustrates the bottom view of the system control hardware, as previously described for FIG. 1D, with the hardware arranged to fit within the footprint of the bottom of the purse.

Figure 1F:
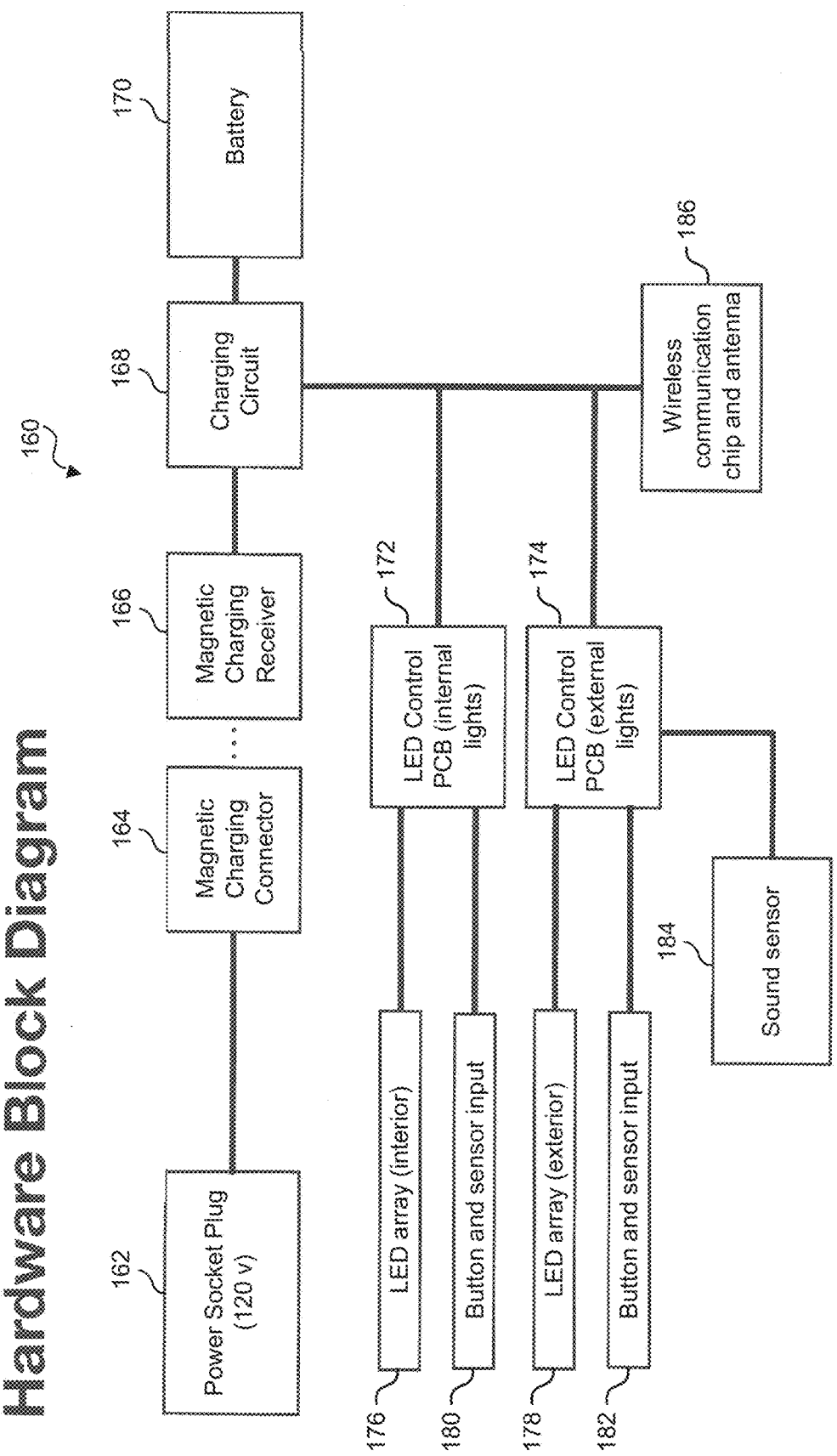
FIG. 1F illustrates an example of a hardware functional block diagram showing the various connected functional components of the system control hardware, in accordance with an embodiment.

FIG. 1F illustrates an example of a hardware functional block diagram 160 showing the various connected functional components of the system control hardware, in accordance with an embodiment. Power socket plug 162 can provide an interface to 120 VAC power for charging the battery of the designer smart accessory purse. Magnetic charging connector 164 can interface the provided AC power to the purse's charging port at the magnetic charging receiver 166. Magnetic charging connector 164 and magnetic charging receiver 166 are akin to magnet mechanism 134 from FIG. 1D to provide the charging port 132 of the purse.

The external power that is interfaced to the purse at the charging port 132 can run through the charging circuit 168 (akin to the charging circuit 136 of FIG. 1D), which can convert the 120 VAC power to 12 VDC for charging the battery 170 (akin to the battery 122 of FIG. 1D). The power provided by the charged battery 170 can then be regulated and distributed by charging circuit 168 to power the LED control PCBs 172/174 of both the interior LED arrays 176 and the exterior LED arrays 178. Button and sensor input 180 can provide external and/or user control inputs to the LED control PCB 172 for controlling the interior LED arrays 176, and button and sensor input 182 can provide external and/or user control inputs to the LED control PCB 174 for controlling the exterior LED arrays 178. Additionally, as shown in FIG. 1F, sound sensor 184 can provide additional external control inputs to the LED control PCB 174 for controlling the exterior LED arrays 178. Sound sensor 184 is preferably a mesh metal protection sound sensor microphone.

Further regarding FIG. 1F, wireless communication chip and antenna 186 allow for wireless connection through Wi-Fi® or Bluetooth® of a software-controlled user device to the designer smart accessory purse. Software loaded onto the user's device can provide control inputs for lighting, including interior and exterior lighting, using mathematical led code or GIF/motion code, for example. The software is further described later in this disclosure with respect to FIG. 8.

Figure 1G:
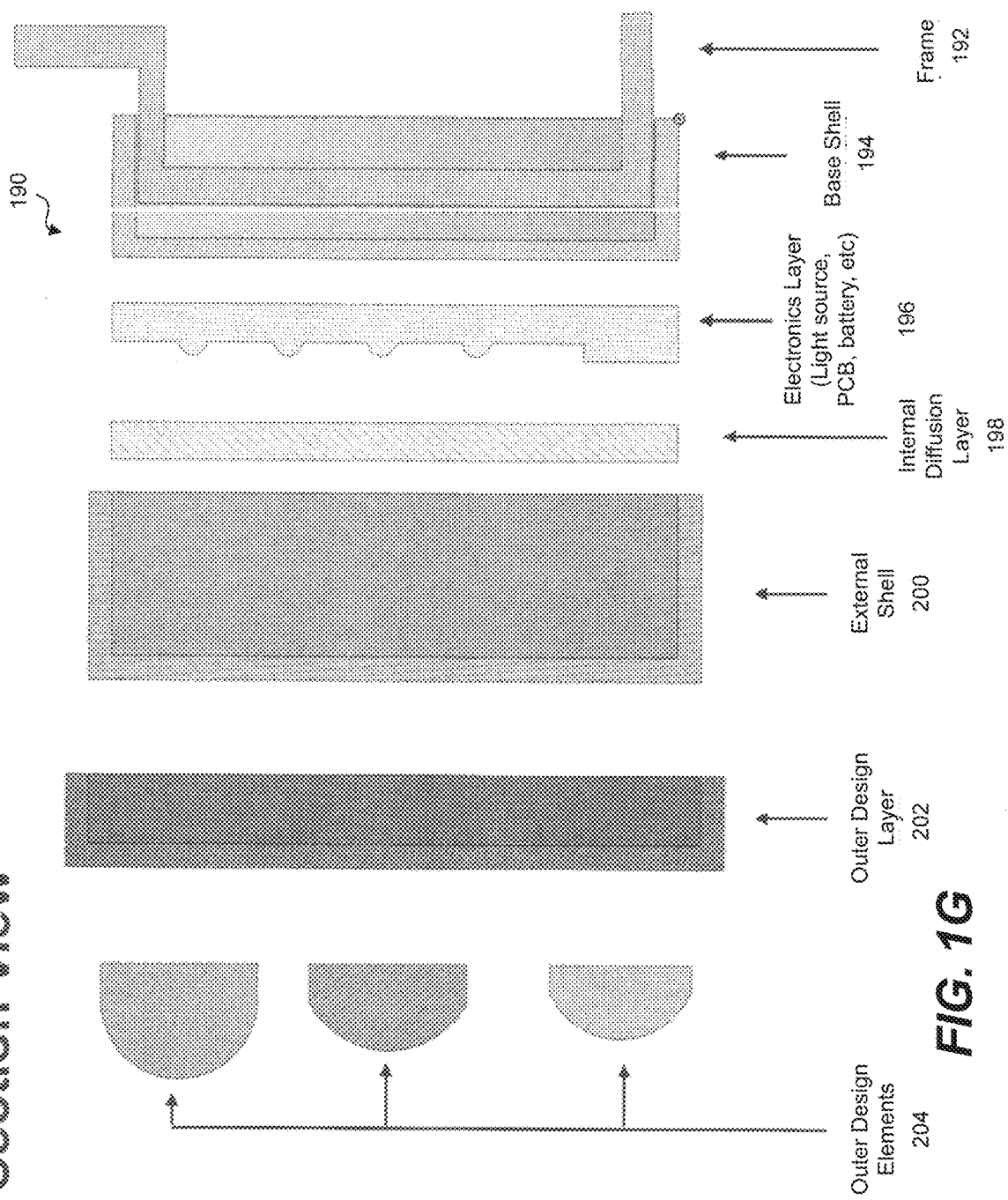
FIG. 1G illustrates layers of the accessory in a sectional view, in accordance with an embodiment.

FIG. 1G illustrates an example 190 of layers that can be associated with an accessory, according to at least one embodiment. The layers are shown in sectional view and can include an inner frame 192, a base shell 194, an electronics layer 196 (including, e.g., a light source, a PCB, a battery, etc.), an internal diffusion layer 198, an external (or exterior) shell 200, an outer design layer 202 and outer design elements 204.

Figure 1H:
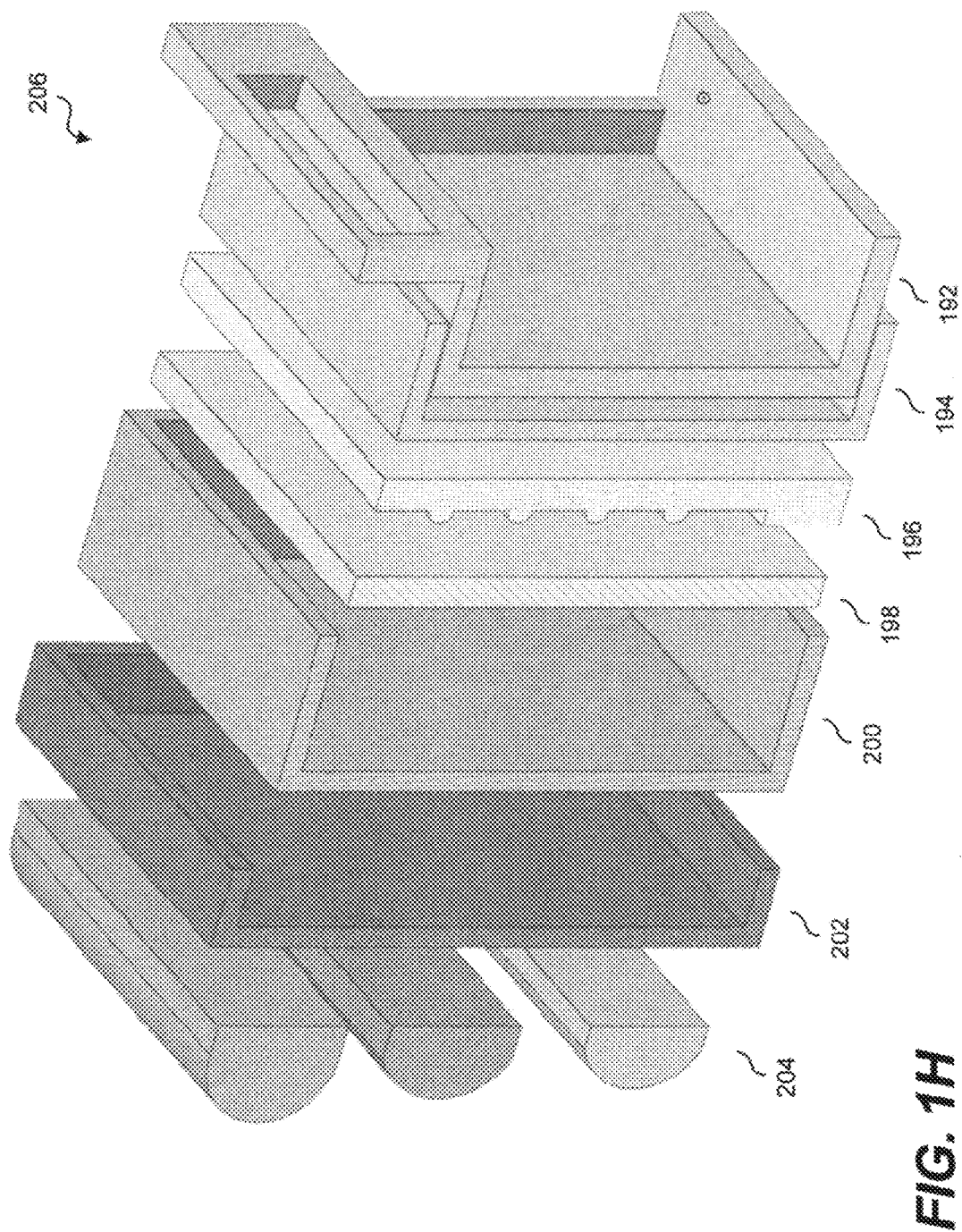
FIG. 1H illustrates layers of the accessory in an isometric sectional view, in accordance with an embodiment.

FIG. 1H illustrates layers of an accessory in isometric sectional view 206, according to at least one embodiment.

Figure 2:
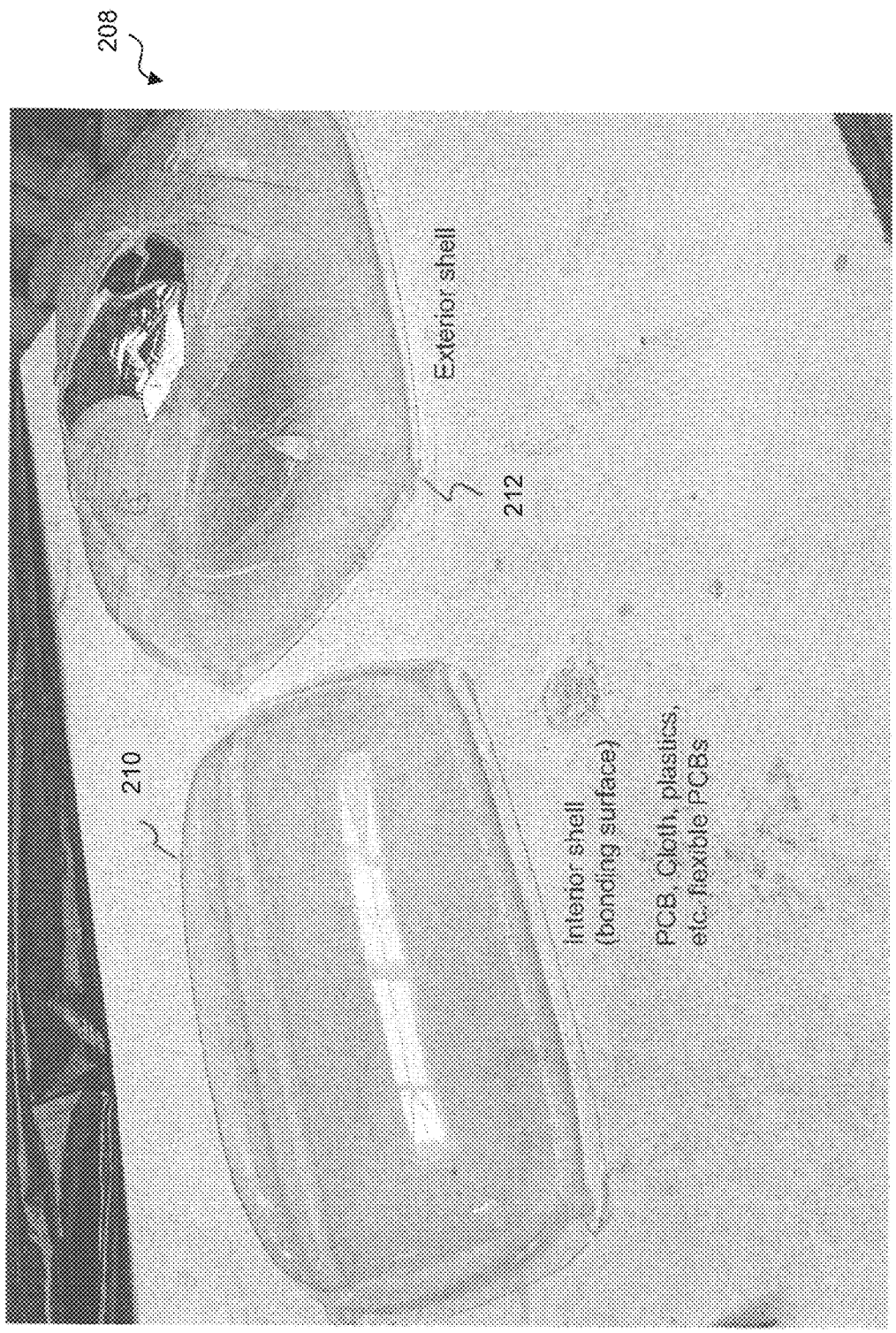
FIG. 2 illustrates an example of an interior shell (left) coated to reflect light inside the interior shell and an exterior shell (right) with a designer translucent layer, in accordance with an embodiment.

FIG. 2 illustrates an example 208 of an interior shell (left) 210, which is metallic coated to reflect light inside the interior shell 210, and an exterior shell (right) 212 with a designer translucent layer having opaque precious metal coated shells, in accordance with an embodiment.

Figure 3:
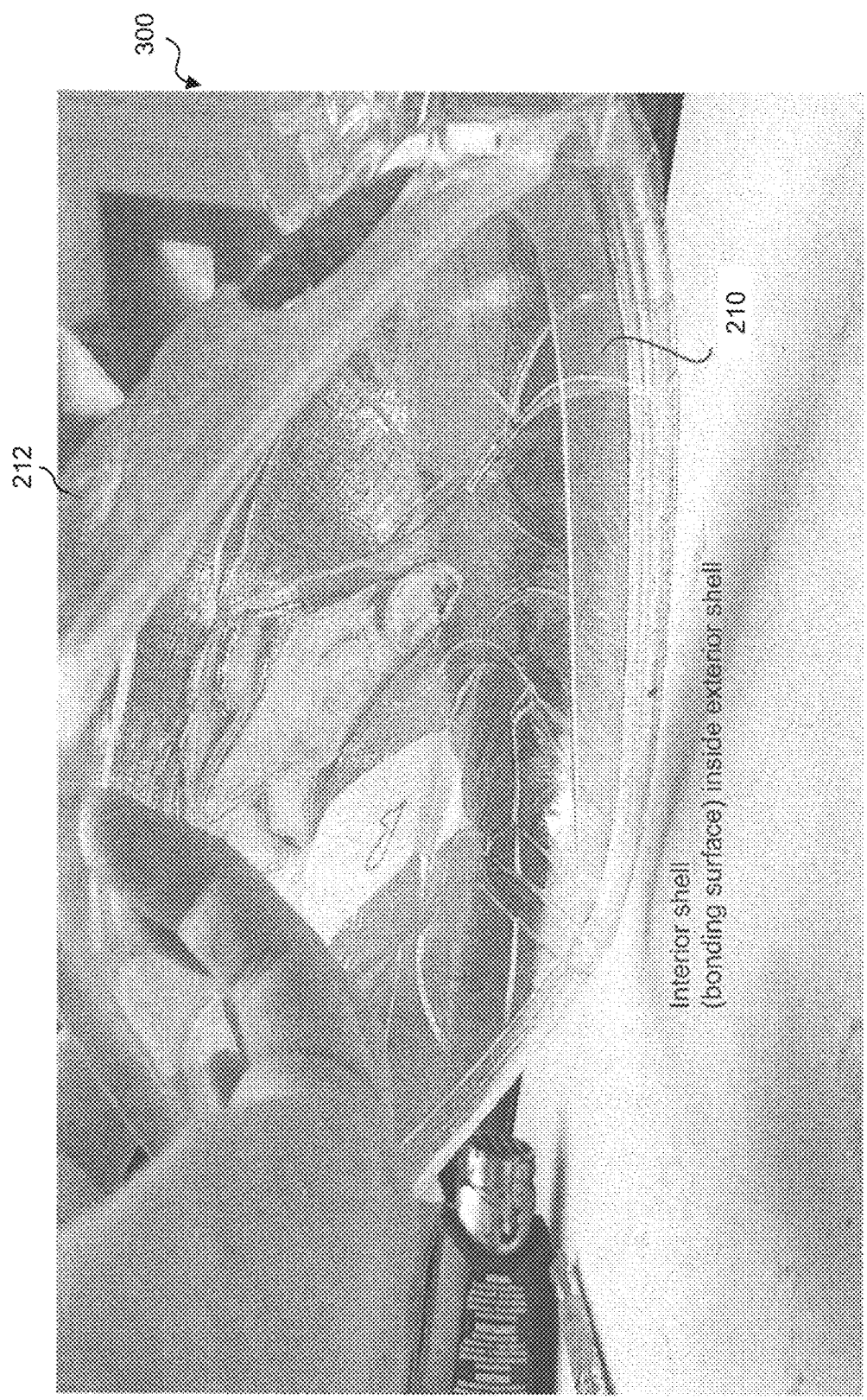
FIG. 3 illustrates an example of the interior shell nested within the exterior shell to create a diffusion chamber and a hardware housing for a designer smart accessory purse, in accordance with an embodiment.

FIG. 3 illustrates an example 300 of the interior shell 210 nested within the exterior shell 212 to create a diffusion layer and a hardware housing for a designer smart accessory purse, in accordance with an embodiment. The diffusion layer can reside under the exterior shell and diffuse light from the LED arrays and from other emitting hardware elements. The diffusion layer can reflect the light using materials that include, but are not limited to, reflective paints, enamels, metal plating in chrome or rhodium, mylars through the air or diffusion materials (such as plastics, lenticular plastics, or the like). The diffusion layer can be made of plastics, thermal and thermoset, polyurethanes, foams, lenticular plastics, metals, plated metal on plastics/ organic elements in chrome, rhodium, gold, or other precious or non-precious metals, organic materials such as cotton, wools, and/or leathers, molded leathers, and organic lab grown leather such as fruit leathers, mycelium, in sheets or fibers, or special cast textures.

Figure 4:
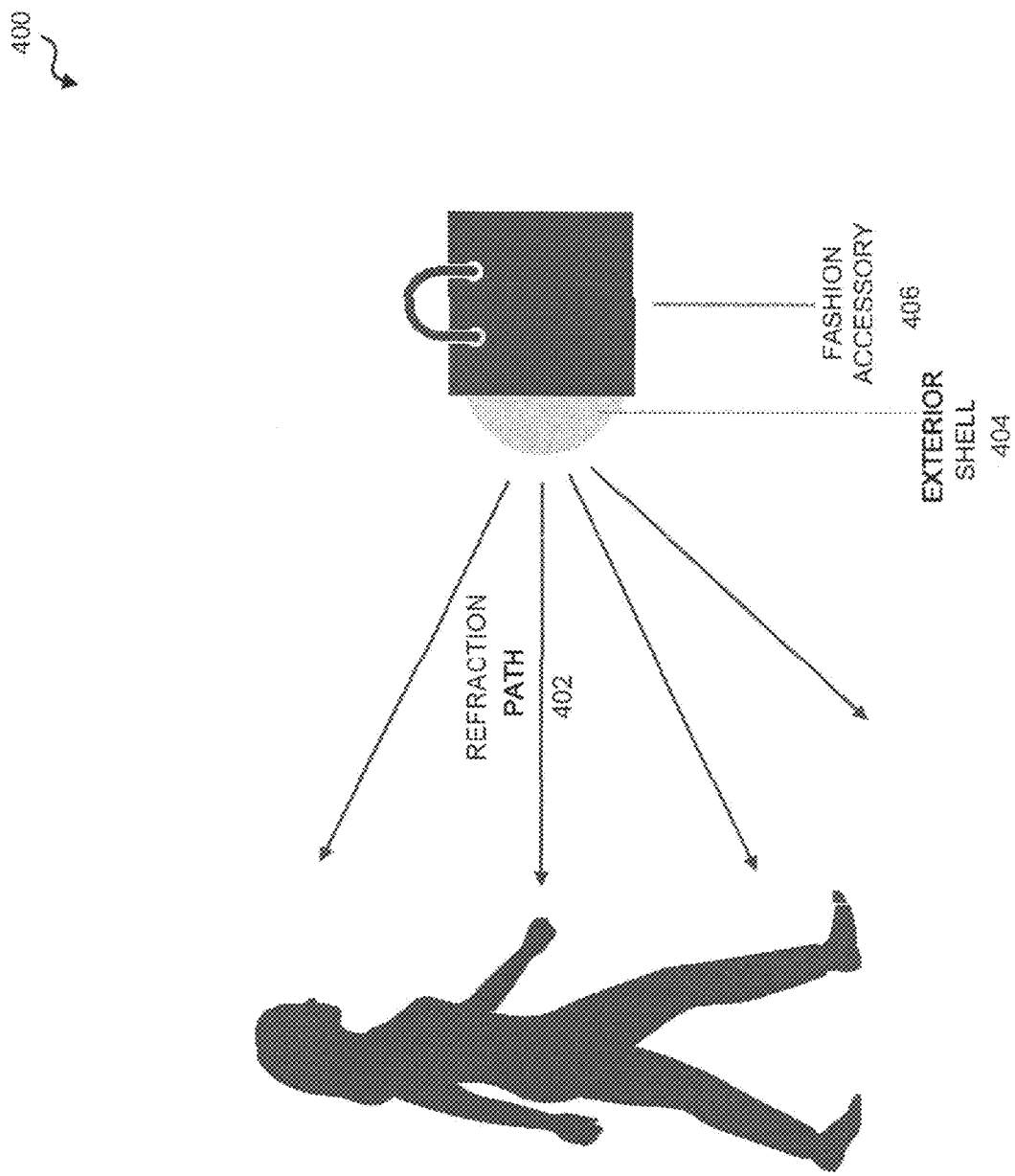
FIG. 4 illustrates an example of a refraction path of visible light emitting from the exterior shell of a designer smart accessory, in accordance with an embodiment.

FIG. 4 illustrates an example 400 of a refraction path 402 of visible light emitting from the exterior shell of a designer smart accessory, in accordance with an embodiment. As seen in FIG. 4, the light visible to the viewer is diffused as it is emitted from the outer (exterior) shell 404 of a fashion accessory 406, such as the designer smart accessory purse. Such diffusion of light is caused by the diffusion layer under the exterior shell 404 of the purse, for example. The diffusion layer can provide a unique visual appearance from the light source based on the diffusion layer manipulation of photon wavelength. The diffusion layer can include the previously described LED arrays and related electronics, and the light can pass through the diffusion layer around the LEDs. The fashion accessory 406 can further include a light refraction chamber wherein the LEDs do not point straight out and can be positioned at greater than a 90-degree angle, pointing away from the outer facing surface vector. In some embodiments, the LEDs can reflect off a reflective surface before the light passes through the outer shell. An additional illustration describing how the diffusion layer affects the visual appearance of light is described below for FIG. 6.

Figure 5:
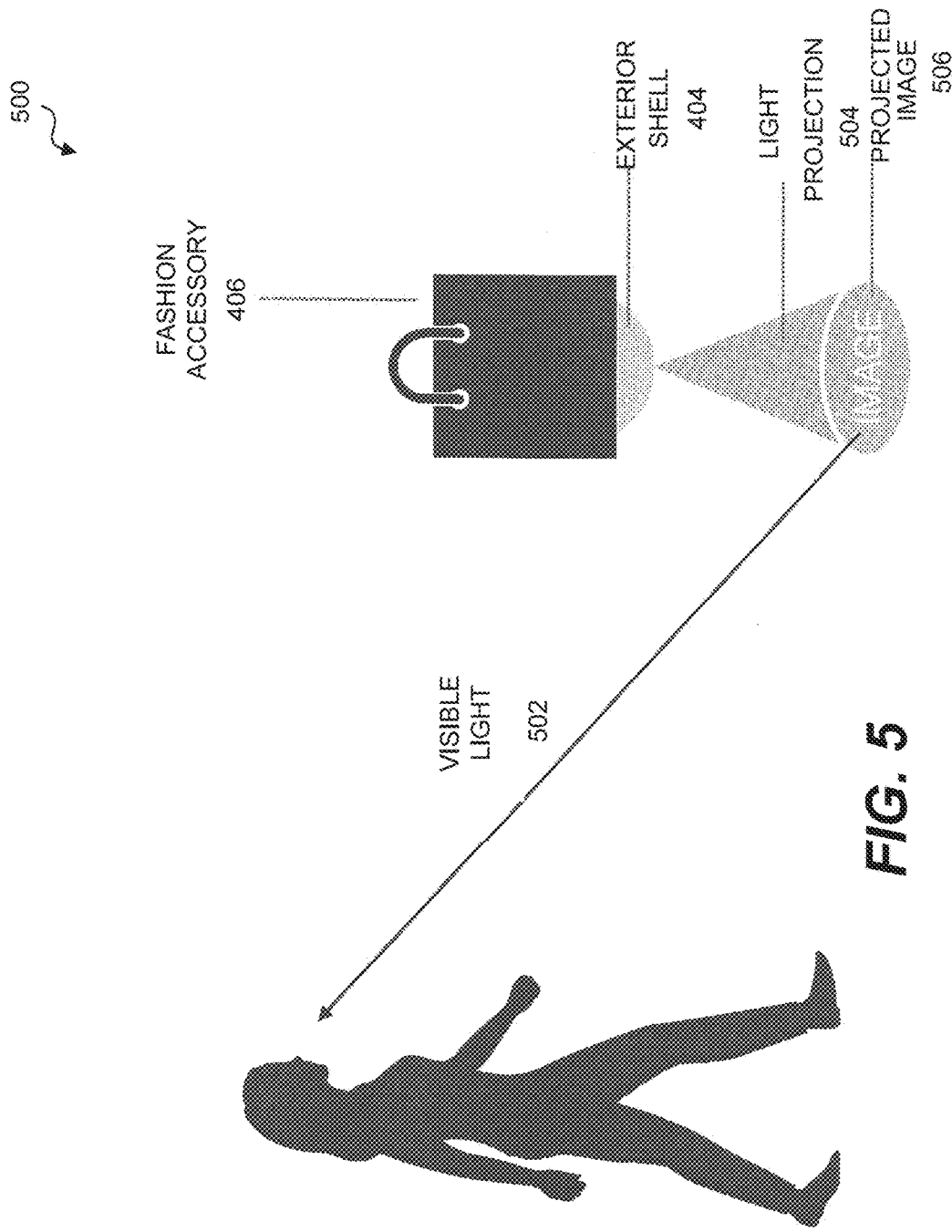
FIG. 5 illustrates an example of visible light reflected from a surface in the environment, the visible light projecting a pattern, logo, or image, in accordance with an embodiment.

FIG. 5 illustrates an example 500 of visible light 502 reflected from a surface in the environment, such as off the floor, where the visible light provides a light projection 504 of a pattern, logo, or image 506, in accordance with an embodiment. The light projection 504 is created by using an exterior shell 404 of a fashion accessory 406 as a filter or screen. The same diffusion layer as described in FIG. 4, as applied under the exterior shell 404 of the fashion accessory 406, can alternatively project patterns of light onto surfaces to display patterns, logos, or images.

Figure 6:
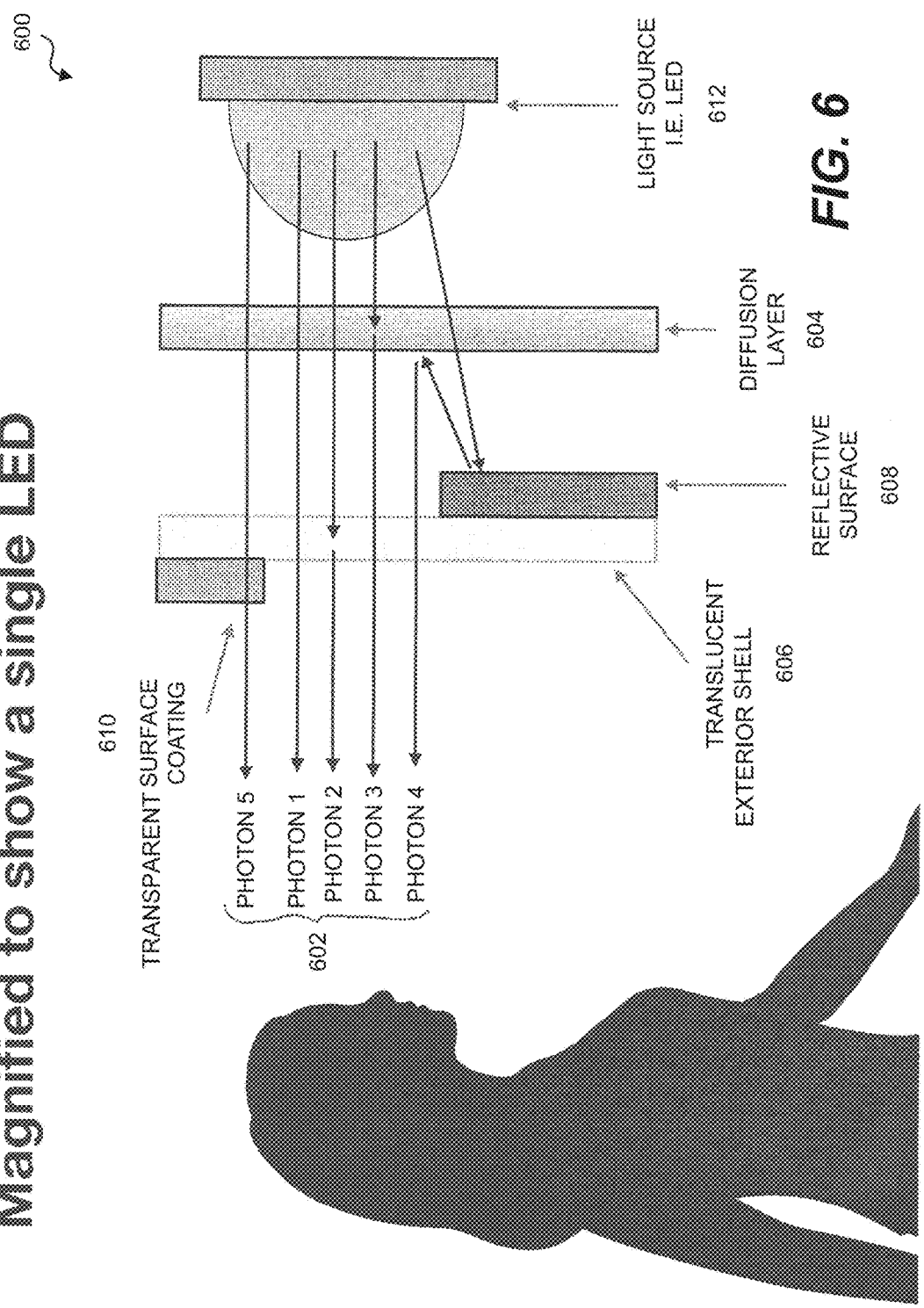
FIG. 6 illustrates paths of five (5) different photons as they interact with various components of the system for illuminating a designer smart accessory, in accordance with an embodiment.

FIG. 6 illustrates an example 600 of paths of five (5) different photons 602 as they interact with various components of the system for illuminating a designer smart accessory, in accordance with an embodiment. Photon 1, emitted from a light source 612, passes through a diffusion layer 604 and a translucent exterior shell 606. Photon 2, emitted from the same light source 612, passes through the diffusion layer 604 and undergoes a phase shift as it goes through the translucent exterior shell 606 (e.g., similar to light in a prism). Photon 3, emitted from the same light source 612, hits the diffusion layer 604 and undergoes a phase shift before passing through the diffusion layer 604. Photon 4, emitted from the same light source 612, passes through the diffusion layer 604, reflects off the reflective surface 608 on the translucent exterior shell 606, reflects off the diffusion layer 604, and passes through the translucent exterior shell 606. Photon 5, emitted from the same light source 612, passes through the diffusion layer 604 and through the transparent surface coating 610 of the translucent exterior shell 606. When photons pass through the diffusion layer 604, bounce off the reflective surface 608, pass through the translucent exterior shell 606, or pass through the surface coating 610 of the translucent exterior shell 606, the photon may undergo a state change that changes the wavelength of the photon, which would change its visual appearance.

Figure 7:
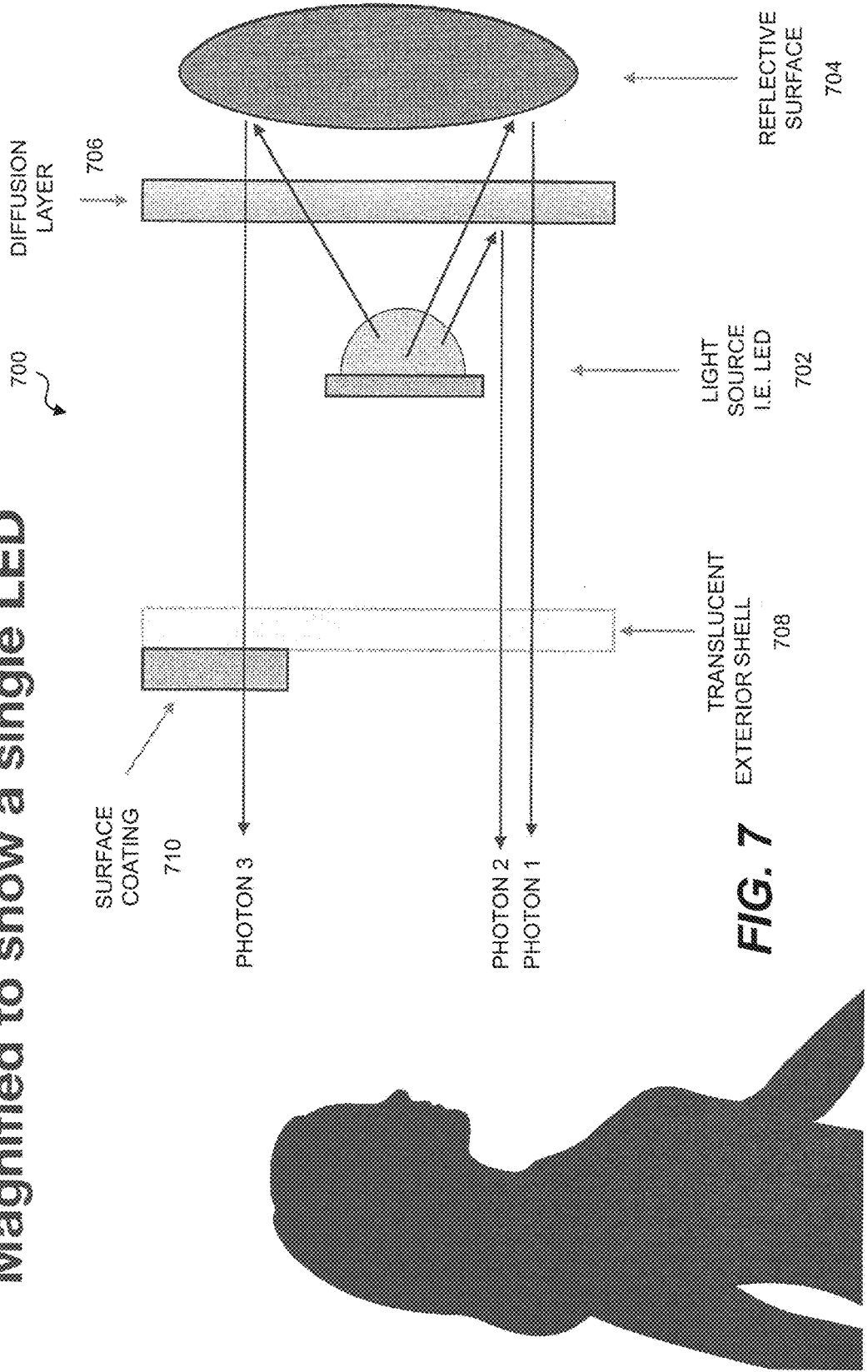
FIG. 7 illustrates paths of three (3) different photons as they are emitted from a light source and interact with various components of the system for illuminating a designer smart accessory, in accordance with an embodiment.

FIG. 7 illustrates an example 700 of paths of three (3) different photons as they are emitted from a light source 702 and interact with various components of the system for illuminating a designer smart accessory, in accordance with an embodiment. Because the light source 702 is emitting in the opposite direction of the viewer, the configuration requires a reflective surface 704 and/or a diffusion layer 706 to bounce photons through the translucent exterior shell 708 before being visible. Photon 1, emitted from the light source 702, passes through the diffusion layer 706, reflects off the reflective surface 704, passes through the diffusion layer 706, and passes through the translucent exterior shell 708. Photon 2, emitted from the same light source 702, bounces off the diffusion layer 706 and passes through the translucent exterior shell 708. Photon 3, emitted from the same light source 702, passes through the diffusion layer 706, reflects off the reflective surface 704, passes through the diffusion layer 706, and passes through the translucent exterior shell 708 and the surface coating 710 of the translucent exterior shell 708. When photons pass through the diffusion layer 706, bounce off the reflective surface 704, pass through the translucent exterior shell 708, or pass through the surface coating 710 of the translucent exterior shell 708, the photon may undergo a state change that changes the wavelength of the photon, which would change its visual appearance.

The disclosed system and apparatus for illuminating designer smart accessories has been described as applied to a designer smart accessory such as a designer smart accessory purse, but a person having ordinary skill in the art would understand that the system and apparatus could be applied to many other types of fashion accessories having various features. The fashion accessories can include video screens, such as OLED, flexible screens, and the like; light, such as LED, EL Panel, LED panels, lasers, bulbs, and other light sources; actuation such as servo motors, actuators, air motor and the like; a battery, such as one or more connected batteries, sustainable power options, such as motion, light, and magnetic; charging ports, wireless charging, such as chi; wiring, that can be free-hanging or can be built into the shell components, using special molding and plating sculptural PCB techniques; sound, where the user can play sound on the device or smart sounds can include special sounds set by user; vibration signals; controllers, such as hardware that can be controlled by one or more controller CPUs; a visual screen that can be goggled or VR lens, or augmented reality screens; cooling systems, such as fans and onboard cooling systems; and visual activators where a smart accessory can include augmented reality skins.

Figure 8:
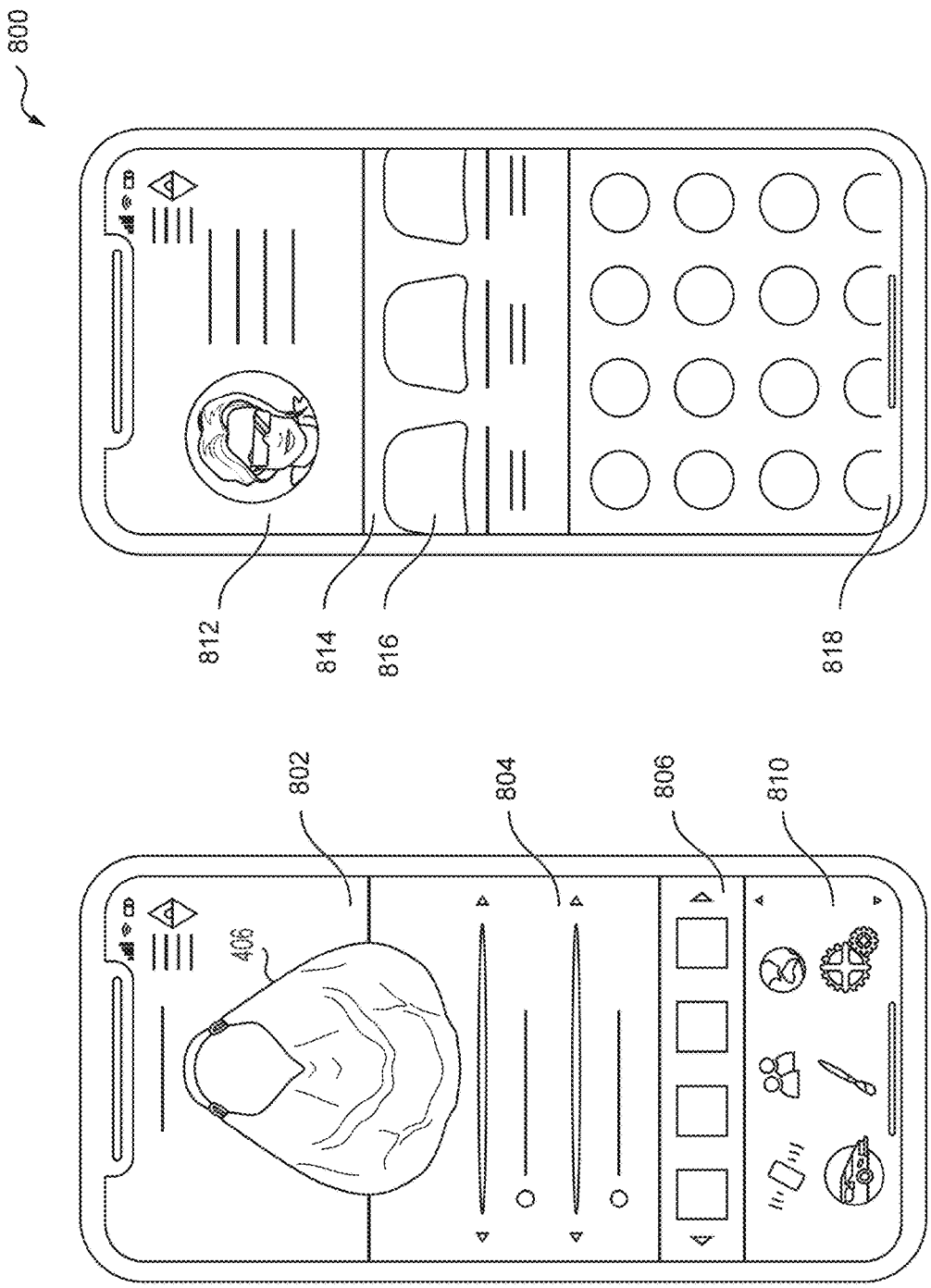
FIG. 8 illustrates an example of a mobile app to control lights, set notifications, and access social features of a designer smart accessory, in accordance with an embodiment.

FIG. 8 illustrates an example 800 of a mobile app to control lights, set notifications, and access social features of a designer smart accessory, in accordance with an embodiment. As illustrated in FIG. 8, the mobile app can provide a preview 802 of a linked fashion accessory 406 (e.g., a designer smart accessory purse). Using the mobile app, a user can control features of the fashion accessory 406 (as described in FIG. 4), such as animation intensity and frequency 804, and color scheme 806. The user can also have access to a number of additional function applications 810 via the mobile app, for example, setting aesthetic alerts, including phone calls and third-party app notifications. Via another view of the mobile app for social connectivity, a user can maintain an owner profile 812 and save various design settings of registered fashion accessories. The saved designs 814 can have share settings 816 such that a user can share various design settings with other users, apps, or registered fashion accessories. Via the mobile app, a user can join a community 818 by subscribing and connecting with other users and owners of fashion accessories.

As described in FIG. 1F, the system control hardware can include features of connectivity, allowing a designer smart accessory to connect, via the mobile app, to wireless control functionality, and allowing a user device to control multiple accessories. Mathematic software, a GIF controller, and sound responsive software can be used to control the illumination hardware of the designer smart accessories. The illumination hardware can be controlled to affect interior lighting, exterior lighting, illumination features, auto match (in which an accessory can automatically calibrate to match the color, colors, or patterns of one's outfit), and the like. In addition, the hardware can be controlled by the software to provide video/display data, storage, and display of non-fungible tokens (NFTs), sound emittance, and the like.

Thus, the software, in conjunction with the hardware, can provide social benefits, such as to connect users through social and connectivity platforms where they can share and exchange data across connected accessories. Aggregate data can be controlled with the software, including visual animating displays of location, biometric, other user data, environmental data, sensor data from the designer smart accessory purse, and the like.

Designer smart accessories can connect to a user's device through Bluetooth® or Wi-Fi®, for example. Additionally, different designer smart accessories of a user's collection or of another user can connect to each other via the software, through Bluetooth® or Wi-Fi®. Users can create custom animations that can be shared, sent, or sold to other users.

Figure 9:
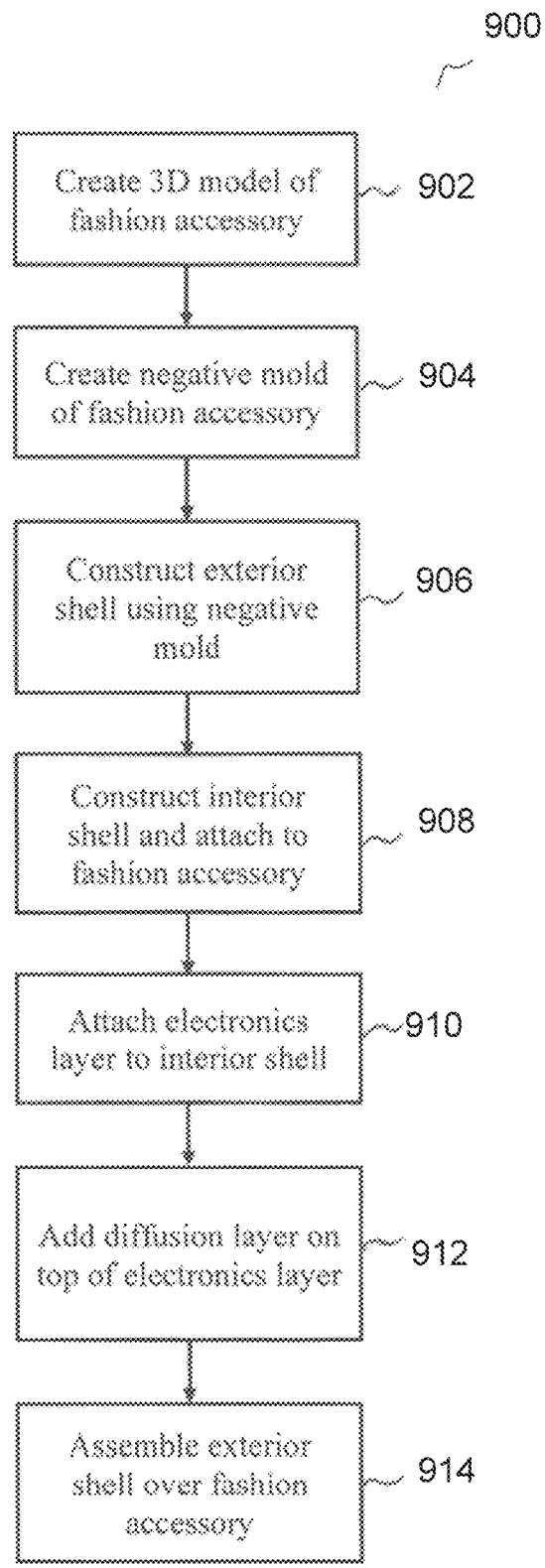
FIG. 9 is a flowchart that illustrates an example of a process for forming the shells of the system for illuminating a designer smart accessory, in accordance with an embodiment.

FIG. 9 is a flowchart illustrating an example of a process 900 for forming an illuminated designer smart accessory, in accordance with various embodiments. Some or all of the process 900 (or any other processes described, or variations and/or combinations of those processes) may be performed using or under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 900 may be performed using any suitable system, such as the computing device 1000 of FIG. 10 An embodiment of the process 900 includes a series of manual and/or computer-automated or assisted operations to.

In 902, design the shape of the fashion accessory using 3D modeling. In step, computer-aided drafting, volumetric design tools, sculpture, or other design methods can be used to create a 3D volumetric model. In 904, create a negative mold of the outline of the fashion accessory using mold-making techniques, 3D printing, or other molding processes.

In 906, construct an outer (exterior) shell using the negative mold or 3D printing in 908, construct an inner (interior) shell that mounts into the outer (exterior) shell. Construct a frame or other attachment method for the inner (interior) shell to attach to the rest of the fashion accessory. The inner (interior) shell can be rigid, flexible, or soft, such as an inner cloth surface of a garment. In 910, attach the electronic components, including a light source and controller, to the inner (interior) shell. Attaching can be performed by sewing, bonding, gluing, welding, fastening (e.g., by screws), or other attachment method.

In 912, add the diffusion layer on top of the electronics and assemble the inner assembly. Test the inner assembly for visual output with the diffusion layer placed over an illuminated light source. In 914, assemble the outer (exterior) shell over the fashion accessory. Outer (exterior) shell assembly can be performed by one or more of several methods, including placing the outer (exterior) shell on top of the electronics, applying a surface coating to the inside of the outer (exterior) shell, applying a surface coating to the outside of the outer (exterior) shell, and/or applying design elements to the outside of the outer (exterior) shell.

Figure 10:
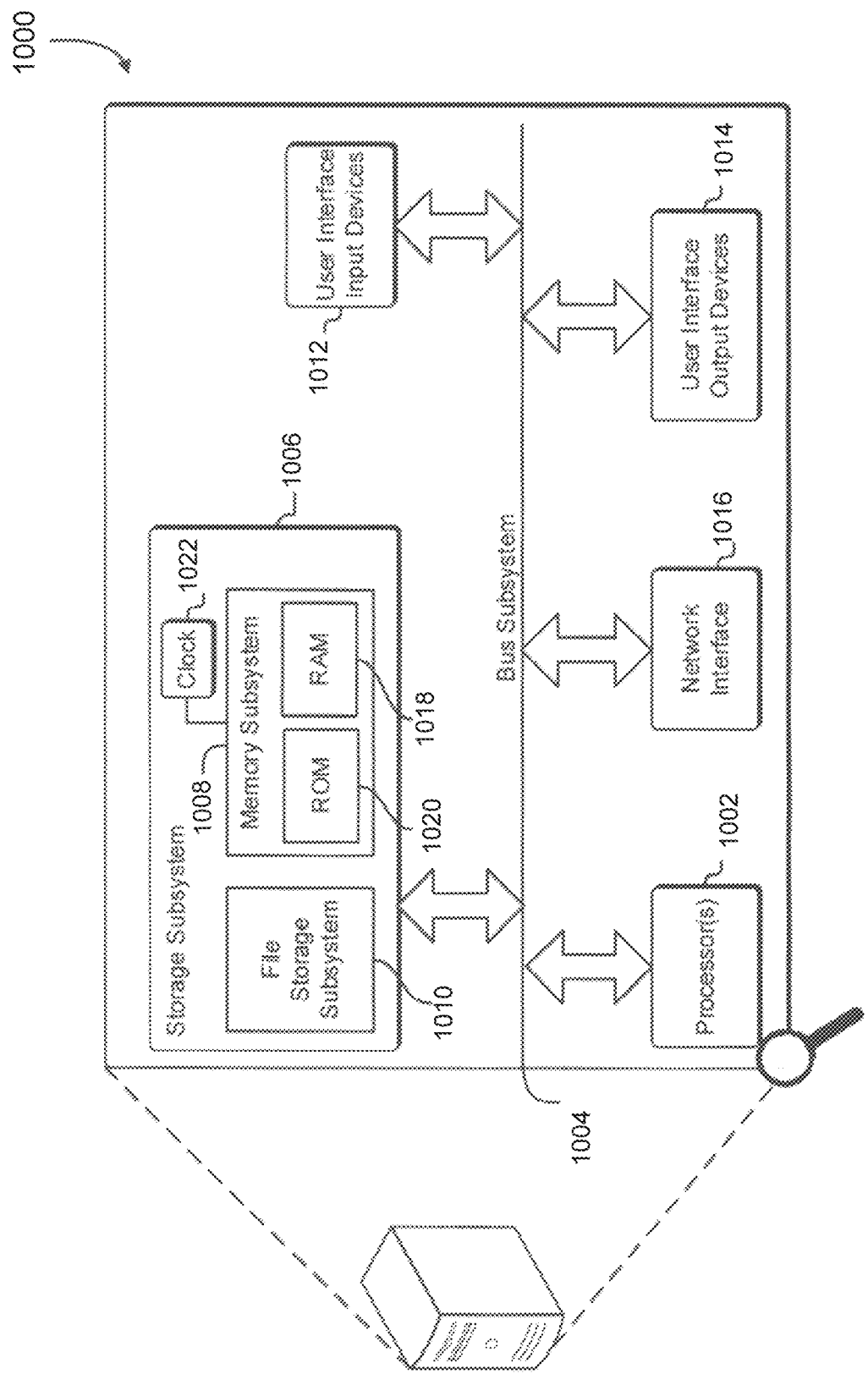
FIG. 10 illustrates a computing device that may be used in accordance with at least one embodiment or in an environment in which various embodiments can be implemented.

FIG. 10 is an illustrative, simplified block diagram of a computing device 1000 that can be used to practice at least one embodiment of the present disclosure. In various embodiments, the computing device 1000 includes any appropriate device operable to send and/or receive requests, messages, or information over an appropriate network and convey information back to a user of the device. The computing device 1000 may be used to implement any of the systems illustrated and described above. For example, the computing device 1000 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1000 may be implemented as a hardware device, a virtual computer system, or one or more programming modules executed on a computer system, and/or as another device configured with hardware and/or software to receive and respond to communications (e.g., web service application programming interface (API) requests) over a network. As shown in FIG. 10, the computing device 1000 may include one or more processors 1002 that, in embodiments, communicate with and are operatively coupled to a number of peripheral subsystems via a bus subsystem. In some embodiments, these peripheral subsystems include a storage subsystem 1006, comprising a memory subsystem 1008 and a file/disk storage subsystem 1010, one or more user interface input devices 1012, one or more user interface output devices 1014, and a network interface subsystem 1016. Such storage subsystem 1006 may be used for temporary or long-term storage of information.

In some embodiments, the bus subsystem may provide a mechanism for enabling the various components and subsystems of 1000 to communicate with each other as intended. Although the bus subsystem 1004 is shown schematically as a single bus, alternative embodiments of the bus subsystem utilize multiple buses. The network interface subsystem 1016 may provide an interface to other computing devices and networks. The network interface subsystem 1016 may serve as an interface for receiving data from and transmitting data to other systems from the computing device 1000. In some embodiments, the bus subsystem 1004 is utilized for communicating data such as details, search terms, and so on. In an embodiment, the network interface subsystem 1016 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols contrast with packet-oriented protocols such as UDP that transmit packets without a guaranteed ordering. Many protocols and components for communicating via such a network are well-known and will not be discussed in detail. In an embodiment, communication via the network interface subsystem 1016 is enabled by wired and/or wireless connections and combinations thereof. In some embodiments, the user interface input devices include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1000. In some embodiments, the one or more user interface output devices 1014 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1000. The one or more user interface output devices 1014 can be used, for example, to present user interfaces to facilitate user interaction with applications performing processes described and variations therein, when such interaction may be appropriate.

In some embodiments, the storage subsystem 1006 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1006. These application modules or instructions can be executed by the one or more processors 1002. In various embodiments, the storage subsystem 1006 additionally provides a repository for storing data used in accordance with the present disclosure. In some embodiments, the storage subsystem 1006 comprises a memory subsystem 1008 and a file/disk storage subsystem 1010. In embodiments, the memory subsystem includes a few memories, such as a main random-access memory (RAM) for storage of instructions and data during program execution and/or a read only memory (ROM), in which fixed instructions can be stored. In some embodiments, the file/disk storage subsystem provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1000 includes at least one local clock 1022. The at least one local clock 1022, in some embodiments, is a counter that represents the number of ticks that have transpired from a particular starting date and, in some embodiments, is located integrally within the computing device 1000. In various embodiments, the at least one local clock 1022 is used to synchronize data transfers in the processors for the computing device 1000 and the subsystems included therein at specific clock 1022 pulses and can be used to coordinate synchronous operations between the computing device 1000 and other systems in a data centre. In another embodiment, the local clock is a programmable interval timer.

The computing device 1000 could be of any of a variety of types, including a portable computer device, tablet computer, a workstation, or any other device described below. Additionally, the computing device 1000 can include another device that, in some embodiments, can be connected to the computing device 1000 through one or more ports (e.g., USB, a headphone jack, lightning connector, etc.). In embodiments, such a device includes a port that accepts a fiber-optic connector. Accordingly, in some embodiments, this device converts optical signals to electrical signals that are transmitted through the port connecting the device to the computing device 1000 for processing. Due to the ever-changing nature of computers and networks, the description of the computing device 1000 depicted in FIG. 10 is intended only as a specific example for purposes of illustrating the preferred embodiment of the device. Many other configurations having more or fewer components than the system depicted in FIG. 10 are possible.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object-level interfaces. The computing device 1000 may include any appropriate hardware, software, and firmware for integrating with a data store as needed to execute aspects of one or more applications for the computing device 1000 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1000 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate. In an embodiment, the computing device 1000 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1000 may provide the content in one or more forms including, but not limited to, forms that are perceptible to the user audibly, visually, and/or through other senses. The handling of requests and responses, as well as the delivery of content, in an embodiment, is handled by the computing device 1000 using PHP: Hypertext Pre-processor (PHP), Python, Ruby, Perl, Java, HTML, XML, JSON, JavaScript, and/or another appropriate language in this example. In an embodiment, operations described as being performed by a single device are performed collectively by multiple devices that form a distributed and/or virtual system.

In an embodiment, the computing device 1000 typically will include an operating system that provides executable program instructions for the general administration and operation of the computing device 1000 and includes a computer-readable storage medium (e.g., a hard disk, random access memory (RAM) 1018, read only memory (ROM) 1020, etc.) storing instructions that if executed (e.g., as a result of being executed) by a processor of the computing device 1000 cause or otherwise allow the computing device 1000 to perform its intended functions (e.g., the functions are performed as a result of one or more processors of the computing device 1000 executing instructions stored on a computer-readable storage medium). In an embodiment, the computing device 1000 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, the computing device 1000 is also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python, JavaScript, or TCL, as well as combinations thereof. In an embodiment, the computing device 1000 is capable of storing, retrieving, and accessing structured or unstructured data. In an embodiment, computing device 1000 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The specification and drawings are, accordingly, to be regarded in an illustrative rather than a restrictive sense. However, it will be evident that various modifications and changes may be made thereunto without departing from the scope of the disclosure as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed but, on the contrary, the intention is to cover all modifications, alternative constructions and equivalents falling within the scope of the disclosure, as defined in the appended claims. The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated, and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Claim elements and steps herein may have been numbered and/or lettered solely as an aid in readability and understanding. Any such numbering and lettering is not intended to and should not be taken to indicate the ordering of elements and/or steps in the claims. Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the disclosure and does not pose a limitation on the scope of the disclosure unless otherwise claimed. No language in the specification should be construed as indicating any non-claimed element as essential to the practice of the disclosure.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. Further, although the words used in this specification to describe the various embodiments are to be understood not only in the sense of their commonly defined meanings, but they can also include, by special definition in this specification, the generic structure, material, or acts of which they represent a single species.

Embodiments of the present disclosure can be described in view of the following clauses:

1. An apparatus, comprising:
   an exterior shell defining an interior chamber to receive one or more items;
   a layer of material applied over at least a portion of the exterior shell, the layer of material to provide an ornamental feature to the exterior shell;
   a diffusion layer disposed on a surface of the exterior shell, the diffusion layer disposed within the interior chamber defined by the exterior shell;
   an electronics layer disposed adjacent to the diffusion layer, the electronics layer comprising one or more light emitting diodes (LEDs) to emit light to pass through at least a portion of the diffusion layer, the exterior shell, and the layer of material, and further to emit light to illuminate the interior chamber; and
   a power source positioned in the interior chamber, the power source comprising a battery or port to connect to an external power supply to enable illumination by the one or more LEDs via at least one or more buttons disposed in the interior chamber or on an exterior surface of the exterior shell.

2. The apparatus of clause 1, wherein the one or more LEDs are arranged to emit light at greater than a 90-degree angle relative to a surface of the diffusion layer.

3. The apparatus of clause 1 or 2, wherein at least one LED of the one or more LEDs is arranged to emit light to illuminate the interior chamber.

4. The apparatus of any of clauses 1-3, wherein an exterior surface of the exterior shell comprises a coating to texturize at least a portion of the exterior surface.

5. The apparatus of any of clauses 1-4, wherein the exterior shell comprises a translucent material with one or more metallic elements disposed on the translucent material to reflect light generated within the exterior shell.

6. The apparatus of any of clauses 1-5, wherein the exterior shell comprises thermoplastic, polyurethane, or foam, and wherein the exterior shell further comprises metal, fabric material, or leather.

7. An apparatus to hold one or more items, comprising:
   a shell defining an interior chamber to hold the one or more items;
   a diffusion layer disposed in the interior chamber; and
   a layer including one or more illumination devices disposed adjacent to the diffusion layer, the one or more illumination devices to generate light to pass through at least a portion of the diffusion layer and the shell; and
   a power source disposed in the interior chamber to power the one or more illumination devices.

8. The apparatus of clause 7, wherein the diffusion layer comprises one or more metallic elements to reflect light generated by the one or more illumination devices, the reflected light to illuminate the interior chamber.

9. The apparatus of clause 7 or 8, wherein the shell comprises a translucent material, the translucent material comprising at least one coating comprising metal.

10. The apparatus of any of clauses 7-9, wherein the diffusion layer comprises a reflective paint or metal plating.

11. The apparatus of any of clauses 7-10, wherein the diffusion layer and the layer including the one or more illumination devices comprise a single layer, the one or more illumination devices of the single layer arranged at an angle relative to a surface of the single layer.

12. The apparatus of clause 11, further comprising a plurality of electrical components coupled to the power source and the one or more illumination devices, and wherein the shell comprises additional layers, the plurality of electrical components arranged between the additional layers.

13. A method, comprising:
fabricating a shell layer defining an interior chamber to hold one or more items of a user;
disposing a diffusion layer within the interior chamber of the shell layer;
arranging one or more light sources in the interior chamber, the one or more light sources arranged to project light through at least the diffusion layer; and
affixing a plurality of electrical hardware to one or more surfaces of the interior chamber, the plurality of electrical hardware affixed to be movable relative to at least one of the shell layer and the diffusion layer, the plurality of electrical hardware electrically connected to the one or more light sources.

14. The method of clause 13, wherein affixing the plurality of electrical hardware to the one or more surfaces of the interior chamber comprises sewing, bonding, gluing, welding, or fastening.

15. The method of clause 13 or 14, further comprising connecting the one or more light sources to a first controller or switch.

16. The method of any of clauses 13-15, further comprising connecting the one or more light sources to a second controller or switch.

17. The method of any of clauses 13-16, wherein the plurality of electrical hardware comprises control hardware to interface with a computer-implemented application usable set or change an illumination effect of the one or more light sources.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted, and what incorporates the essential idea of the disclosure.

Embodiments of this disclosure are described, including the best mode known to the inventors for carrying out the invention. Variations of those embodiments will become apparent to those of ordinary skill in the art upon reading the foregoing description, and modifications may be made by those of ordinary skill in the art without departing from the spirit and scope of the invention. The inventors expect skilled artisans to employ such variations as appropriate and the inventors intend for embodiments of the present disclosure to be practiced otherwise than as specifically described. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. An apparatus, comprising:
an exterior shell defining an interior chamber to receive one or more items;
a layer of material applied over at least a portion of the exterior shell, the layer of material to provide an ornamental feature to the exterior shell;
a diffusion layer disposed on a surface of the exterior shell, the diffusion layer disposed within the interior chamber defined by the exterior shell;
an electronics layer disposed adjacent to the diffusion layer, the electronics layer comprising one or more light emitting diodes (LEDs) to emit light to pass through at least a portion of the diffusion layer, the exterior shell, and the layer of material, and further to emit light to illuminate the interior chamber; and
a power source positioned in the interior chamber, the power source comprising a battery or port to connect to an external power supply to enable illumination by the one or more LEDs via at least one or more buttons disposed in the interior chamber or on an exterior surface of the exterior shell.

2. The apparatus of claim 1, wherein the one or more LEDs are arranged to emit light at greater than a 90-degree angle relative to a surface of the diffusion layer.

3. The apparatus of claim 1, wherein at least one LED of the one or more LEDs is arranged to emit light to illuminate the interior chamber.

4. The apparatus of claim 1, wherein an exterior surface of the exterior shell comprises a coating to texturize at least portion of the exterior surface.

5. The apparatus of claim 1, wherein the exterior shell comprises a translucent material with one or more metallic elements disposed on the translucent material to reflect light generated within the exterior shell.

6. The apparatus of claim 1, wherein the exterior shell comprises thermoplastic, polyurethane, or foam, and wherein the exterior shell further comprises metal, fabric material, or leather.

7. An apparatus to hold one or more items, comprising:
a shell defining an interior chamber to hold the one or more items;

a diffusion layer disposed in the interior chamber, wherein the diffusion layer comprises one or more metallic elements to reflect light generated by one or more illumination devices, the reflected light to illuminate the interior chamber;

a layer including one or more illumination devices disposed adjacent to the diffusion layer, the one or more illumination devices to generate light to pass through at least a portion of the diffusion layer and the shell; and a power source disposed in the interior chamber to power the one or more illumination devices.

8. The apparatus of claim 7, wherein the shell comprises a translucent material, the translucent material comprising at least one coating comprising metal.

9. The apparatus of claim 7, wherein the diffusion layer comprises a reflective paint or metal plating.

10. The apparatus of claim 7, wherein the diffusion layer and the layer including the one or more illumination devices comprise a single layer, the one or more illumination devices of the single layer arranged at an angle relative to a surface of the single layer.

11. The apparatus of claim 10, further comprising a plurality of electrical components coupled to the power source and the one or more illumination devices, and wherein the shell comprises additional layers, the plurality of electrical components arranged between the additional layers.

12. The apparatus of claim 7, wherein one or more interior and exterior illumination devices are controlled by a power source positioned in the interior chamber.

13. A method, comprising:
fabricating a shell layer defining an interior chamber to hold one or more items of a user;

disposing a diffusion layer within the interior chamber of the shell layer, wherein the diffusion layer comprises one or more metallic elements to reflect light generated by one or more illumination devices, the reflected light to illuminate the interior chamber;

arranging one or more light sources in the interior chamber, the one or more light sources arranged to project light through at least the diffusion layer; and affixing a plurality of electrical hardware to one or more surfaces of the interior chamber, the plurality of electrical hardware affixed to be movable relative to at least one of the shell layers and the diffusion layer, the plurality of electrical hardware electrically connected to the one or more light sources.

14. The method of claim 13, wherein affixing the plurality of electrical hardware to the one or more surfaces of the interior chamber comprises sewing, bonding, gluing, welding, or fastening.

15. The method of claim 13, further comprising connecting the one or more light sources to a first controller or switch.

16. The method of claim 13, further comprising connecting the one or more light sources to a second controller or switch.

17. The method of claim 13, wherein the plurality of electrical hardware comprises control hardware to interface with a computer-implemented application usable set or change an illumination effect of the one or more light sources.

* * * * *